United States Patent
Hsiao et al.

(10) Patent No.: US 11,151,630 B2
(45) Date of Patent: Oct. 19, 2021

(54) ON-LINE PRODUCT RELATED RECOMMENDATIONS

(71) Applicant: Oath Inc., New York, NY (US)

(72) Inventors: JenHao Hsiao, Taipei (TW); Jia Li, Santa Clara, CA (US)

(73) Assignee: VERIZON MEDIA INC., New York, NY (US)

( * ) Notice: Subject to any disclaimer, the term of this patent is extended or adjusted under 35 U.S.C. 154(b) by 1140 days.

(21) Appl. No.: 14/325,192

(22) Filed: Jul. 7, 2014

(65) Prior Publication Data
US 2016/0005097 A1  Jan. 7, 2016

(51) Int. Cl.
*G06Q 30/06* (2012.01)
*G06T 7/11* (2017.01)

(52) U.S. Cl.
CPC .......... *G06Q 30/0631* (2013.01); *G06T 7/11* (2017.01); *G06T 2207/10* (2013.01); *G06T 2207/30196* (2013.01)

(58) Field of Classification Search
CPC .. G06Q 30/0201–0206; G06Q 30/0251–0277; G06Q 30/0601–0643; G06T 7/90; G06T 7/00; G06T 7/10–194; G06T 7/40; G06T 7/44; G06T 2207/10; G06T 2207/30196; G06T 7/11; G06K 9/4652
See application file for complete search history.

(56) References Cited

U.S. PATENT DOCUMENTS

| | | | |
|---|---|---|---|
| 4,956,870 A | 9/1990 | Hara | |
| 5,444,791 A | 8/1995 | Kamada et al. | |
| 5,524,161 A | 6/1996 | Omori et al. | |
| 5,719,959 A | 2/1998 | Krtolica | |
| 6,041,133 A | 3/2000 | Califano et al. | |
| 6,072,895 A | 6/2000 | Bolle et al. | |
| 6,315,197 B1 | 11/2001 | Beardsley | |
| 6,325,287 B1 | 12/2001 | Nakajima et al. | |
| 6,343,150 B1 | 1/2002 | Darrell et al. | |
| 6,571,003 B1 * | 5/2003 | Hillebrand | A61B 5/0064 382/100 |
| 6,591,011 B1 | 7/2003 | Nielsen | |
| 6,650,776 B2 | 11/2003 | Ihara et al. | |
| 6,920,231 B1 | 7/2005 | Griffin | |
| 7,142,714 B2 | 11/2006 | Ihara et al. | |
| 7,424,155 B2 | 9/2008 | Ihara et al. | |
| 7,542,881 B1 | 9/2009 | Billiotte et al. | |
| 7,783,135 B2 | 8/2010 | Gokturk | |
| 7,787,711 B2 | 8/2010 | Agam et al. | |
| 7,809,192 B2 | 10/2010 | Gokturk | |

(Continued)

OTHER PUBLICATIONS

A fashion mix-and-match expert system for fashion retailers using fuzzy screening approach. Science Direct. 2009. W.K. Wong, et al. (Year: 2009).*

(Continued)

*Primary Examiner* — William J Allen

(74) *Attorney, Agent, or Firm* — Cooper Legal Group LLC

(57) ABSTRACT

Example methods, apparatuses, and/or articles of manufacture are disclosed that may be implemented, in whole or in part, using one or more computing devices to facilitate or support one or more processes and/or operations for one or more on-line recommendations, such as product-related recommendations, for example.

22 Claims, 9 Drawing Sheets

(56) References Cited

U.S. PATENT DOCUMENTS

| | | | |
|---|---|---|---|
| 7,813,561 | B2 | 10/2010 | Jia |
| 7,962,500 | B2 | 6/2011 | Van Zwol et al. |
| 8,019,162 | B2 | 9/2011 | Zhang et al. |
| 8,131,118 | B1 | 3/2012 | Jing et al. |
| 8,144,368 | B2 | 3/2012 | Rodriguez et al. |
| 8,253,802 | B1 | 8/2012 | Anderson et al. |
| 8,306,872 | B2* | 11/2012 | Inoue ............ G06Q 30/06 705/26.7 |
| 8,320,706 | B2 | 11/2012 | Kim et al. |
| 8,345,979 | B2 | 1/2013 | Davis |
| 8,358,840 | B2 | 1/2013 | Bronstein et al. |
| 8,417,037 | B2 | 4/2013 | Bronstein et al. |
| 8,559,681 | B2 | 10/2013 | Benini |
| 8,634,654 | B2 | 1/2014 | van Zwol |
| 8,635,119 | B1* | 1/2014 | Hariharan ......... G06Q 30/0629 705/26.1 |
| 9,508,021 | B2 | 11/2016 | van Zwol |
| 2002/0057838 | A1 | 5/2002 | Steger |
| 2004/0202355 | A1 | 10/2004 | Hillhouse |
| 2005/0088515 | A1 | 4/2005 | Geng |
| 2005/0089216 | A1* | 4/2005 | Schiller ............ G06K 9/342 382/159 |
| 2005/0105804 | A1 | 5/2005 | Francos |
| 2006/0104484 | A1 | 5/2006 | Bolle et al. |
| 2006/0159316 | A1 | 7/2006 | Chisamore et al. |
| 2006/0251292 | A1 | 11/2006 | Gokturk |
| 2006/0262962 | A1* | 11/2006 | Hull ............ G06F 21/78 382/103 |
| 2007/0036400 | A1 | 2/2007 | Watanabe et al. |
| 2007/0088953 | A1 | 4/2007 | Hilton et al. |
| 2007/0179921 | A1 | 8/2007 | Zitnick et al. |
| 2008/0273770 | A1 | 11/2008 | Kohout |
| 2008/0279481 | A1 | 11/2008 | Ando |
| 2009/0041340 | A1 | 2/2009 | Suzuki et al. |
| 2009/0092336 | A1 | 4/2009 | Tsurumi |
| 2009/0116698 | A1* | 5/2009 | Zhang ............ G06K 9/00362 382/111 |
| 2009/0175538 | A1 | 7/2009 | Bronstein et al. |
| 2009/0196510 | A1 | 8/2009 | Gokturk |
| 2009/0284527 | A1 | 11/2009 | Ofek et al. |
| 2009/0319388 | A1 | 12/2009 | Yuan et al. |
| 2010/0002915 | A1 | 1/2010 | Govan |
| 2010/0014756 | A1 | 1/2010 | Kato et al. |
| 2010/0067752 | A1 | 3/2010 | Vestgote |
| 2010/0080425 | A1 | 4/2010 | Bebis et al. |
| 2010/0092093 | A1 | 4/2010 | Akatsuka et al. |
| 2010/0098324 | A1 | 4/2010 | Fujieda |
| 2010/0104184 | A1 | 4/2010 | Bronstein et al. |
| 2010/0232643 | A1 | 9/2010 | Chen |
| 2010/0232709 | A1 | 9/2010 | Zhang et al. |
| 2010/0299355 | A1 | 11/2010 | Shiyama et al. |
| 2011/0019921 | A1 | 1/2011 | Hamada |
| 2011/0129155 | A1 | 6/2011 | Oami et al. |
| 2011/0311110 | A1 | 12/2011 | Benini |
| 2011/0317922 | A1 | 12/2011 | Chertok |
| 2011/0320317 | A1 | 12/2011 | Yuan et al. |
| 2012/0002880 | A1 | 1/2012 | Lipson et al. |
| 2012/0045095 | A1 | 2/2012 | Tate et al. |
| 2012/0093400 | A1 | 4/2012 | Saito |
| 2012/0114254 | A1 | 5/2012 | Nakjima |
| 2012/0134576 | A1 | 5/2012 | Sharma et al. |
| 2012/0140996 | A1 | 6/2012 | Hara et al. |
| 2012/0195478 | A1 | 8/2012 | Hsu et al. |
| 2012/0263385 | A1 | 10/2012 | Van Zwol et al. |
| 2013/0089260 | A1 | 4/2013 | Pires et al. |
| 2013/0282630 | A1* | 10/2013 | Attenberg ............ G06N 5/02 706/12 |
| 2014/0095479 | A1* | 4/2014 | Chang ............ G06F 17/30699 707/722 |
| 2014/0193074 | A1* | 7/2014 | Huang ............ G06K 9/4676 382/180 |
| 2014/0254923 | A1* | 9/2014 | Vidal Calleja ....... G06K 9/4676 382/159 |
| 2014/0254927 | A1* | 9/2014 | Bhardwaj ......... G06Q 30/0643 382/165 |
| 2015/0332622 | A1* | 11/2015 | Liu ............ G09G 3/2003 705/14.54 |

OTHER PUBLICATIONS

U.S. Appl. No. 14/158,598 / Final Rejection, dated Mar. 29, 2016, 23 pages.
U.S. Appl. No. 14/158,598 / Electronic Terminal Disclaimer Filed and Approved, filed May 26, 2016, 3 pages.
U.S. Appl. No. 14/158,598 / Response After Final Action and Amendments, dated May 31, 2016, 16 pages.
U.S. Appl. No. 14/158,598 / Advisory Action, dated Jul. 11, 2016, 2 pages.
U.S. Appl. No. 14/158,598 / After Final Consideration Program Request, dated Jul. 29, 2016, 8 pages.
U.S. Appl. No. 14/158,598 / Notice of Allowance and Fees, dated Aug. 18, 2016, 8 pages.
U.S. Appl. No. 14/158,598 / Issue Fee Payment, filed Oct. 26, 2016, 1 page.
Zografos; Affine Invariant, Model-Based Object Recognition Using Robust Metrics and Bayesian Statistics, ICIAR 2005, LNCS 3656, pp. 407-414, 2005.
Romberg; Scalable Logo Recognition in Real-World Images, Proceedings of ACM International Conference on Multimedia, ACM, 2011.
U.S. Appl. No. 14/158,598 / Non-Final Rejection, dated Sep. 15, 2015, 25 pages.
U.S. Appl. No. 14/158,598 / Amendment/req. Reconsideration after Final, dated Dec. 15, 2015, 20 pages.
U.S. Appl. No. 13/088,305, filed Apr. 15, 2011, 38 Pages.
U.S. Appl. No. 13/088,305 / Filing Receipt, Mailed May 2, 2011, 3 pages.
U.S. Appl. No. 13/088,305 / Notice of Publication, dated Oct. 18, 2012, 1 Page.
U.S. Appl. No. 13/088,305 / Non-Final Office Action, dated Dec. 18, 2012, 12 Pages.
U.S. Appl. No. 13/088,305 / Non-Final Office Action Response, dated Mar. 6, 2013, 23 Pages.
U.S. Appl. No. 13/088,305 / Final Office Action, dated May 21, 2013, 20 pages.
U.S. Appl. No. 13/088,305 / Request for Continued Examination, dated Aug. 21, 2013, 45 Pages.
U.S. Appl. No. 13/088,305 / Notice of Allowance and Fees Due (PTOL-85), dated Sep. 16, 2013, 11 Pages.
U.S. Appl. No. 13/088,305 / Issue Fee Payment (PTO-85B), dated Dec. 16, 2013, 5 Pages.
U.S. Appl. No. 13/088,305 / Issue Notification, dated Dec. 31, 2013, 1 Page.
U.S. Appl. No. 14/158,598, filed Jan. 17, 2014, 47 Pages.
U.S. Appl. No. 14/158,598 / Filing Receipt, Mailed Feb. 4, 2014m, 3 Pages.
U.S. Appl. No. 14/158,598 / Notice of Publication, dated May 15, 2014, 1 Page.
Landan, Object Recognition by Affine Invariant Matching, 1988, IEEE.
Pope, Model-Based Object Recognition A Survey of Recent research, 1994, technical report.
Lamdan, Schwartz, et al. Affine Invariant Model Based Object Recognition, 1990, IEEE Transactions on Robotics and Automation vol. 6, No. 5, Oct. 1990.
Rothganger, 3D Object Modeling and Recognition Using Local Affine-Invariant Image Descriptors and Multi-View Spatial Constraints, International Journal of Computer Vision 66, 3 (2006) 231-259.
Bronstein, Spatially-sensitive affine-invariant image descriptors, Computer Vision—ECCV 2010 Lecture Notes in Computer Science col. 6312, 210, pp. 197-208.

(56) References Cited

OTHER PUBLICATIONS

Krystian Mikolajczyk, Scale & Affine Invariant Interest Point Detectors, International Journal of Computer Vision 60(1), 63-86, 2004.

Irani, Combinatorial and Experimental Results for Randomized Point Matching Algorithms, Proceedings of the Twelfth annual symposium on Computational Geometry, pp. 68-77, 1996.

Tuytelaars, Matching Widely Separated Views Based on Affine Invariant Regions, international Journal of Computer Vision 59(1), 61-85, 2004.

Sandy Irani, Combinatorial and experimental results for randomized point matching algorithms, Dec. 1999, Elsevier, Computational geometry 12 (1999) 17-31.

U.S. Appl. No. 14/158,598 / Issue Notification, dated Nov. 9, 2016, 1 page.

\* cited by examiner

ON-LINE PRODUCT RELATED RECOMMENDATIONS

FIELD

The present disclosure relates generally to an on-line recommendation and, more particularly, to providing an on-line product-related recommendation.

CONTENT

The Internet is widespread. The World Wide Web or simply the Web, provided by the Internet, is growing rapidly, at least in part, from the large amount of content being added seemingly on a daily basis. A wide variety of content in the form of stored signals, such as, web pages, text documents, images, audio files, and/or video files, for example, is continually being processed, such as, identified, located, retrieved, accumulated, stored, and/or communicated, for example. With so much on-line content being available, a number of tools and/or services may be provided to users so as to allow for copious amounts of content to be searched in a more efficient and/or more effective manner. For example, service providers may allow users to search the Web and/or other like networks using various systems, such as content management systems, including search engines, for example. Search engines may, for example, help a user to search the Web from a search query so as to try to locate and/or retrieve content of interest.

At times, in addition to locating and/or retrieving content, search engines may provide on-line recommendations, such as by offering suggestions about what computing device users may be interested in. Typically, on-line recommendations may be offered via a displayed web page, for example, and may be based, at least in part, on searching, viewing, etc. habits of users. At times, on-line recommendations may, for example, improve user engagement, increase click-through and/or conversion rates, boost revenue, or the like. In some instances, however, on-line recommendations may suffer due, at least in part, to lack of browsing and/or user history (e.g., a cold start problem, etc.), insufficient content coverage (e.g., newer content, etc.), system complexity (e.g., labor-intensive implementations, etc.), or the like.

BRIEF DESCRIPTION OF THE DRAWINGS

Non-limiting and non-exhaustive aspects are described with reference to the following figures, wherein like reference numerals refer to like parts throughout the various figures unless otherwise specified.

DETAILED DESCRIPTION

Figure 1:
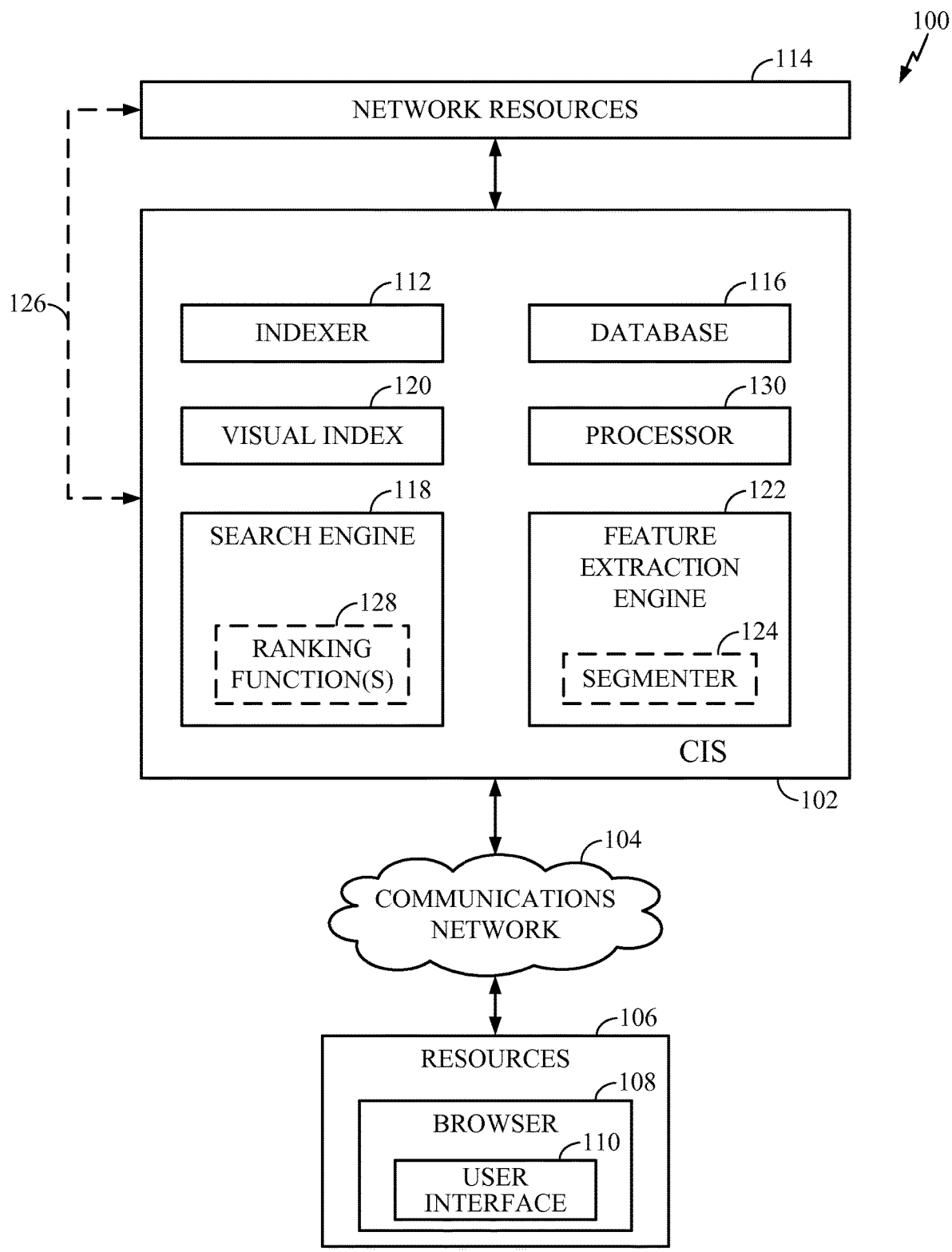
FIG. 1 is a schematic diagram illustrating example features of an implementation of an example computing environment.

In the following detailed description, numerous specific details are set forth to provide a thorough understanding of claimed subject matter. However, it will be understood by those skilled in the art that claimed subject matter may be practiced without these specific details. In other instances, methods, apparatuses, and/or systems that would be known by one of ordinary skill have not been described in detail so as not to obscure claimed subject matter.

Some example methods, apparatuses, and/or articles of manufacture are disclosed herein that may be used, in whole or in part, to facilitate and/or support one or more processes and/or operations for one or more on-line recommendations, such as product-related recommendations, for example. As used herein, "on-line" may refer to a type of access that may be implemented via one or more computing and/or communications networks, such as, for example, the Internet, an intranet, a device network, such as a network for peripherals, and/or a computer network. In this context, "on-line product" may refer to a displayable good and/or service that may be offered electronically, such as via one or more computing and/or communications networks, for example, to satisfy a want and/or need. An on-line product may be representative of a physical product, such as, for example, represented via one or more electrical digital signals, such as signal packets and/or states, such as physical states on a memory device (e.g., a server, etc.) and may comprise an image, text, audio, video, combinations, etc., just to name a few examples. Thus, an on-line product may be in a form that although not necessarily capable of being perceived by a human (e.g., via human senses, etc.), may nonetheless be transformed into a form capable of being so perceived, such as visually (e.g., on a display, etc.) and/or audibly, for example. As such, an on-line product may be transmitted, processed, and/or stored electronically, such as in a product-related and/or like database, for example. In general, it may be understood that an on-line product may be intended to be referenced in a particular discussion, although in the particular context the term "product" may be employed for ease of discussion.

With advances in technology, it has become more typical to employ distributed computing approaches in which a computational problem may be divided among computing devices, including one or more clients and one or more servers, via a computing and/or communications network. A network may comprise two or more network devices and/or may couple network devices so that signal communications, such as in the form of signal packets, for example, may be exchanged, such as between a server and a client device and/or other types of devices, including between wireless devices coupled via a wireless network, for example. A network may be very large, such as comprising thousands of nodes, millions of nodes, billions of nodes, or more, as examples.

In this context, the term network device refers to any device capable of communicating via and/or as part of a network and may comprise a computing device. While network devices may be capable of sending and/or receiving signals (e.g., signal packets, etc.), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, and/or otherwise, may include, as examples, dedicated rack-mounted servers, desktop computers, laptop computers, set top boxes, tablets, netbooks, smart phones, integrated devices, the like and/or any combination thereof. Signal packets, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" and/or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices, including, for example, one or more illustrative examples and/or combinations thereof.

A network may also include now known, and/or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, and/or any combination thereof. Thus, a network may be worldwide in scope and/or extent. Likewise, sub-networks, such as may employ differing architectures and/or may be compliant and/or compatible with differing protocols, such as computing and/or communication protocols (e.g., network protocols, etc.), may interoperate within a larger network. In this context, the term sub-network refers to a part of a network. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices, but without the communicating devices necessarily specifying one or more intermediate devices and/or may include communicating as if intermediate devices are not necessarily involved in communication transmissions. For example, a router may provide a link and/or connection between otherwise separate and/or independent LANs.

In this context, a private network refers to a particular, limited set of network devices able to communicate with other network devices in the particular, limited set, such as via signal packet transmissions, for example, without a need for re-routing and/or redirecting such network communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. It is understood in this context that a private network may provide outgoing network communications to devices not in the private network, but such devices outside the private network may not direct inbound network communications to devices included in the private network.

The Internet refers to a decentralized global network of interoperable networks that comply with the Internet Protocol (IP). It is noted that there are several versions of the Internet Protocol. Here, the term Internet Protocol or IP is intended to refer to any version, now known and/or later developed. The Internet includes local area networks (LANs), wide area networks (WANs), wireless networks, and/or long haul public networks that, for example, may allow signal packets to be communicated between LANs. The term world wide web (WWW) and/or similar terms may also be used, although it refers to a sub-portion of the Internet that complies with the Hypertext Transfer Protocol or HTTP. It is noted that there are several versions of the Hypertext Transfer Protocol. Here, the term Hypertext Transfer Protocol or HTTP is intended to refer to any version, now known and/or later developed. It is likewise noted that in various places in this document substitution of the term Internet with the term world wide web may be made without a significant departure in meaning and may, therefore, not be inappropriate in that the statement would remain correct with such a substitution.

Signal packets, also referred to as signal packet transmissions, may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet may, for example, be communicated via a communication channel and/or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address. Although the Internet comprises a network of interoperable networks, not all of those interoperable networks are necessarily available or accessible to the public.

Although physically connecting a network via a hardware bridge is done, a hardware bridge may not typically include a capability of interoperability via higher levels of a network protocol. A network protocol refers to a set of signaling conventions for computing and/or communications between or among devices in a network, typically network devices; for example, devices that substantially comply with the protocol and/or that are substantially compatible with the protocol. In this context, the term "between" and/or similar terms are understood to include "among" if appropriate for the particular usage. Likewise, in this context, the terms "compatible with", "comply with" and/or similar terms are understood to include substantial compliance and/or substantial compatibility.

Typically, a network protocol has several layers. These layers may be referred to here as a network stack. Various types of network transmissions may occur across various layers. For example, as one moves higher in a network stack, additional operations may be available by initiating network transmissions that are compatible and/or compliant with a particular network protocol at these higher layers. Therefore, for example, a hardware bridge may be unable to forward signal packets since it may operate at a layer of a network stack that does not provide that capability. Although higher layers of a network protocol may, for example, affect device permissions, user permissions, etc., a hardware bridge, for example, may typically provide little user control, such as for higher layer operations.

A VPN, such as previously described, may enable a remote device to communicate via a local network, but may also have drawbacks. A router may allow network communications in the form of network transmissions (e.g., signal packets), for example, to occur from a remote device to a VPN server on a local network. A remote device may be authenticated and a VPN server, for example, may create a special route between a local network and the remote device through an intervening router. However, a route may be generated and/or also regenerate if the remote device is power cycled, for example. Also, a VPN typically may affect a single remote device, for example, in some situations. A network, such as the Internet, as one example, may be very large, such as comprising thousands of nodes, millions of nodes, billions of nodes, or more, as examples.

As alluded to previously, in an implementation, one or more processes and/or operations for on-line recommendations, such as product-related recommendations, for example, may be used, at least in part, in connection with content management systems, which may include a search engine. As used herein, "search engine" and "recommendation engine" may be used interchangeably and may refer to a computing platform (e.g., computing device and/or network device), such as a special purpose computing device, as an example, that may be employed, at least in part, to locate, identify, retrieve, and/or recommend one or more web documents and/or on-line products of interest, such as from a search query, user and/or client input, expressed and/or implied user interest, and/or the like. The terms "web document," "electronic document," and "document" may be used interchangeably herein and may refer to a collection of digital signals, such as communicated and/or stored signals (e.g., physical memory states, etc.), for example, representing any content including, as examples, source code, text, image, audio, video file, and/or the like. Thus, in this particular context, "content" refers to any expression, realization, and/or communication of generated and/or adapted information, knowledge, experience, or thing represented via stored physical states, such as stored digital states, and/or represented via communicated physical signals, such as electronically communicated digital signals, for example. Thus, in some instances, content may include, for example, digital content associated with a computing and/or communications network and/or like resources that may be used, at least in part, to facilitate and/or support one or more processes and/or operations for on-line product-related recommendations, such as discussed below.

Thus, as indicated, web documents may include one or more products and may, for example, be processed by a special purpose computing device, although processing may not necessarily take place in a form in which it is intended of being easily perceived by human senses during processing; however, after processing, on-line products may, for example, be played and/or displayed to or by a user and/or client device, such as on a web document in connection with a product-related recommendation, so that it is capable of being perceived by human senses (e.g., via display, etc.). In general, typically reference to a user in this context is referring to a user in connection with use of a device, such as a client device, for example, and/or other similar network and/or computing device. In an implementation, web documents may include, for example, one or more embedded references and/or hyperlinks to images, audio and/or video files, and/or other web documents. For example, one common type of reference may comprise a Uniform Resource Locator (URL). As a way of illustration, web documents may include a web page, an electronic user profile, a news feed, a rating or review post, a status update, a portal, a blog, an e-mail, a text message, a link, an image, an Extensible Markup Language (XML) document, a media file, a web page pointed and/or referred to by a URL, etc., just to name a few examples.

As was indicated, a search engine may provide one or more on-line recommendations, such as with respect to one or more products that may be of particular interest to a user, for example. In this context, "on-line recommendation," "product-related recommendation," "recommendation," and/or similar terms may refer to a process of electronically presenting suggestions with respect to one or more products that may be preferred by one or more users, such as for purposes of purchasing, shopping, and/or the like. As will be seen, at times, a product-related recommendation may be based, at least in part, on an inference and/or prediction of one or more user interests, such as, for example, with respect to one or more visually similar products, visually preferred products, and/or contextually similar products. Product-related recommendations may be presented electronically via a display of a computing device, for example, such as in the form of one or more suggested purchases via a "virtual storefront" of e-commerce (e.g., on-line, over the Internet, etc.). Claimed subject matter is not limited to a particular type of product-related presentation and/or recommendation, of course.

In some instances, certain on-line recommendation approaches, such as on-line product-type approaches, however, such as, for example, so-called "view-also-view" and/or "buy-also-buy" approaches, among others, may typically rely on users' feedback, relatively extensive history of purchases and/or on-line searches, and/or the like. For example, users' expressed preferences (e.g., "likes," etc.), inputted search queries, on-line coverage (e.g., reviews, ratings, etc.), etc. may be collected over time and/or analyzed in an attempt to predict and/or infer what users might like in the future. As such, users may, for example, be recommended products that were previously viewed and/or purchased by similar and/or the same users. At times, these or like approaches, although capable of recommending certain trending, popular, and/or like alternatives, may nevertheless underperform with respect to user interest, such as failing to generate a sufficient amount of user purchasers, for example.

In addition, certain on-line products that may be of potential interest to users, such as items depicted in one or more web documents (e.g. photos, posts, shows, editorials, etc.), for example, may be unannotated and/or may have insufficient and/or "noisy" annotations (e.g., brief, abbreviated, biased, etc.). In this context, the term "noisy" may refer to content that may potentially be distracting for a user. For example, extractable annotations from certain web documents may differ from an interpretation a user may have for a corresponding product, which may also at times contribute to lower recommendation accuracy. Also, in some instances, a web document may comprise, for example, a variety of differently-sized and/or shaped products, some of which may produce clutter and/or visual "noise" for a user, again, because it may be more distracting than helpful. At times, manually labeling and/or annotating web documents, such as to facilitate and/or support product searching, matching, etc., for example, may at least partially address these and/or like issues, but may be time-consuming, labor-intensive, and/or error-prone. Accordingly, it may be desirable to develop one or more methods, systems, and/or apparatuses that may facilitate and/or support more effective and/or more efficient recommendation of on-line products, such as visually similar, personally preferred, and/or contextually similar products, for example. As was indicated, this may enhance users' searching and/or on-line shopping experience, improve users' clicking behavior, increase usability of a search engine, and/or the like.

Thus, as will be described in greater detail below, in an implementation, one or more web documents, such as web pages having one or more product-related images, annotated or otherwise, may be processed, and one or more regions of interest within these images may, for example, be identified. At times, a region of interest may comprise (e.g., be representative of), for example, a product or a portion thereof that may be more likely to be preferred by one or more users, such as for purposes of purchasing and/or on-line shopping, for example. As will be seen, to facilitate and/or support identification of one or more regions of interest, a map representing visual saliency across an image may, for example, be generated and/or used, at least in part. Visual saliency, such as for a visual saliency map, for example, refers to one or more features of an image, such as an on-line product-related image, for example, so as that visual contrasts of various types and/or amounts result in varying degrees of visual differentiation for a product or portion thereof from other, surrounding portions of the image, such as for a user. As discussed below, based, at least in part, on a saliency map, one or more regions of interest, such as having visual attributes indicating where a product of interest, and/or portions thereof, is more likely to stand out visually, for example, may be extracted, and a corresponding product, and/or portion thereof, may be determined and/or identified. In some instances, one or more background and/or visual "noise" removal-type operations and/or processes may be utilized, at least in part, to determine and/or identify an on-line product, for example, depicted against a plain background, such as a plain white background, as will also be seen, for an illustrative embodiment. Based, at least in part, on an identified product, one or more databases may be searched, such as via a visual-bag-of-words-type processing, for example, and one or more on-line product-related recommendations may be determined and/or provided, such as to one or more users, in an embodiment, for example.

Attention is now drawn to FIG. 1, which is a schematic diagram illustrating features of an implementation of an example computing environment 100 capable of facilitating and/or supporting, in whole or in part, one or more processes and/or operations for on-line recommendations, such as product-related recommendations, for example. Example computing environment 100 may be operatively enabled using one or more special purpose computing apparatuses, content communication devices, content storage devices, computer-readable media, applications and/or instructions, various electrical and/or electronic circuitry and/or components, input signals, etc., as described herein with reference to particular example implementations.

As illustrated, computing environment 100 may include one or more special purpose computing platforms, such as, for example, a Content Integration System (CIS) 102 that may be operatively coupled to a computing and/or communications network, such as 104, that a user and/or client may employ to communicate with CIS 102 via resources 106, for example. Thus, in an embodiment, CIS 102 may be implemented in the context of one or more content management systems associated with public networks (e.g., the Internet, the World Wide Web) private networks (e.g., intranets), public and/or private search engines, Real Simple Syndication (RSS) and/or Atom Syndication (Atom)-type applications, etc., just to name a few examples.

Resources 106 may comprise, for example, one or more special purpose computing devices and/or platforms, such as a desktop computer, mobile device, personal digital assistant, etc. capable of communicating with and/or otherwise having access to the Internet and/or other computing and/or communications network (e.g., via a wired and/or wireless communications network, such as network 104, etc.). Resources 106 may include a browser 108 and a user interface 110, such as a graphical user interface (GUI), for example, that may initiate transmission of one or more electrical digital signals representing a search query, user and/or client communication and/or the like. Browser 108 may facilitate access to and/or viewing of documents via the Internet and/or another computing and/or communications network, for example, such as HTML web pages, pages formatted for mobile devices (e.g., WML, XHTML Mobile Profile, WAP 2.0, C-HTML, etc.), and/or the like. User interface 110 may interoperate with any suitable input device (e.g., keyboard, mouse, touch screen, digitizing stylus, etc.) and/or output device (e.g., display, speakers, etc.) for interaction, such as user interaction, with resources 106. It should be noted that even though a certain number of resources 106 are illustrated in FIG. 1, any number of resources may be operatively coupled to CIS 102 via any suitable computing and/or communications network, such as 104, for example.

As seen, CIS 102 may include one or more searching and/or indexing aspects and/or processes, represented generally via an indexer 112 capable of accessing network resources 114, for example, to locate, extract, and/or index one or more web documents, product-related images and/or text, and/or other suitable content. For example, as discussed below, indexer 112 may facilitate and/or support generating a visual vocabulary using one or more appropriate techniques. In this context, "visual vocabulary" refers to a collection of visual attributes and/or characteristics descriptive of one or more suitable features, such as color and/or texture-type features, for example, of one or more product-related images included in a database. A visual vocabulary may typically be formed by collecting suitable features from a representative corpus of product-related images, for example, and quantizing an applicable feature space into a discrete number of visual words, such as via one or more appropriate statistical approaches. For example, in some instances, k-means clustering-type approach may be used, at least in part, or otherwise considered, though claimed subject matter is not so limited. In this context, "visual words" refers to k-cluster centers, such as descriptive of color and/or texture-type features of product-related images within a cluster. One or more features of product-related images may, for example, be converted into visual words, such as by determining which k-cluster center they are nearest to in a feature space. Here, a Euclidean distance between applicable k-cluster centers and/or input descriptors may, for example, be used, at least in part, just to illustrate one possible implementation. Visual vocabularies, visual words, and/or quantization approaches are generally known and need not be described here in greater detail. Depending, at least in part, on an implementation, indexer 112 may, for example, store all and/or part of a visual vocabulary and/or other suitable content (e.g., visual words, URLs, search query and/or image mappings, etc.) in a database 116, for example, such as to facilitate and/or support on-line searches, product-related recommendations, and/or the like.

CIS 102 may further include a search engine 118 that may be supported by a suitable index, such as a visual index 120, for example, in the form of one or more stored digital signals, for example. In some instances, visual index 120 may, for example, be used, at least in part, to facilitate and/or support one or more product-related searches, on-line recommendations, and/or any other suitable process and/or operation discussed herein. As will be seen, at times, visual index 120 may comprise, for example, an inverted index comprising, for example, a visual vocabulary descriptive of a number of product-related images, such as mapped from a set of descriptors to a list of word numbers, just to illustrate one possible implementation. At times, an inverted index may comprise, for example, a table or like structure having pointers from a word number to applicable indices of database images (e.g., database 116, etc.) in which respective visual word occur. Likewise, inverted file indexing is generally known and need not be described here in greater detail. Thus, product-related images may be more effectively and/or more efficiently searched, located, retrieved, etc., such as by referencing a mapping of visual words to image numbers to determine whether one or more images share particular words, for example. Claimed subject matter is not so limited, of course. For example, in some instances, visual index 120 may include content that may be accessed and/or processed by search engine 118 and/or otherwise used, at least in part, in support of an on-line search in response to a search query. Thus, in some instances, search engine 118 may, for example, communicate with user interface 110 and may retrieve for display and/or recommendation via resources 106 a listing of search and/or recommendation results associated with visual index 120 and/or database 116 in response to one or more digital signals representing a search query, user and/or client communication, expressed and/or implied user interest, and/or the like.

Network resources 114 may include any type of public and/or private content, such as represented by stored digital signals (e.g., physical memory states), for example, accessible over the Internet, one or more intranets, and/or the like. For example, network resources 114 may include one or more web documents, such as web pages, review blogs, news outlets, audio, video, image, text files, social networks, user profiles, search query logs, databases, and/or the like. It should be noted that, optionally and/or alternatively, at least part of content associated with network resources 114 (e.g., web documents, etc.) may be stored within CIS 102, such as in database 116, visual index 120, etc., though claimed subject matter is not so limited, of course.

In certain implementations, one or more digital signals associated with visual index 120 (e.g., a visual vocabulary, etc.) may, for example, be generated and/or provided, at least in part, via a feature extraction engine 122. For example, feature extraction engine 122 may facilitate and/or support extraction of one or more digital signals representing suitable image-related features, such as visual-type features, just to illustrate one possible implementation. As discussed below, at times, features may be extracted from one or more product-related images based, at least in part, on one or more interest points within segmented regions of a product-related image and may comprise, for example, one or more texture-type features and/or one or more color-type features. As further illustrated, feature extraction engine 122 may, for example, include and/or otherwise be operatively coupled to a segmenter 124. Segmenter 124 may, for example, partition any suitable representation of a product-related image (e.g., a saliency map, edge map, etc.) into one or more regions, such as to facilitate and/or support processing. For example, at times, segmentation may help with identifying and/or extracting a region of interest, such as indicative of a product preferred by one or more users, for example, as will also be seen. Of course, claimed subject matter is not so limited. For example, segmenter 124 may facilitate and/or support one or more operations and/or processes performed in connection with an on-line search, such as query parsing, normalization, mapping, etc. using one or more appropriate techniques (e.g., pattern-matching, language modeling, etc.). Of course, illustrative operations (e.g., such as query parsing, normalization, mapping, etc.) are generally well understood and need not be described in significant detail.

At times, it may be advantageous to utilize one or more real-time and/or near real-time indexing techniques, for example, so as to keep a suitable index (e.g., visual index 120, database 116, etc.) sufficiently updated. In this context, "real time" may refer to an amount of timeliness of content, which may have been delayed by an amount of time attributable to electronic communication as well as other signal processing. For example, CIS 102 may be capable of subscribing to one or more suitable resources, such as fashion-related web sites, shopping blogs, ratings and/or review portals, social networking platforms, etc. via a content feed 126. In some instances, content feed 126 may comprise, for example, a live or direct feed, though claimed subject matter is not so limited. CIS102 may, for example, be capable of receiving streaming or periodic updates, product-related and/or otherwise, via a suitable application programming interface (API) (e.g. Flickr®, FashionWeekOn-line.com, etc.) so as to facilitate and/or support more effective and/or more efficient searching, indexing, caching, etc. Of course, these are merely examples relating to indexing techniques to which claimed subject matter is not limited. Feed 126 may, for example, be optional in certain implementations.

As previously mentioned, in some instances, it may be desirable to rank web documents and/or products, using for example, well known and/or to be developed techniques, so as to assist in presenting and/or recommending web documents and/or on-line products, such as to one or more users. Accordingly, CIS 102 may employ one or more ranking functions, indicated generally by dashed lines at 128, to rank documents and/or on-line products in an order that may, for example, be based, at least in part, on keyword relevance, recency, usefulness, popularity, visual product similarity, personal visual preference, contextual similarity, product price, product type, and/or the like. For example, as discussed below, in some instances, ranking function(s) 128 may be capable of learning a style of a product that a user may prefer and/or context of a purchase based, at least in part, on user's purchasing and/or viewing history, just to illustrate a few possible implementations. For example, in an embodiment, one or more machine learning techniques, such as a support vector machine (SVM)-type technique (e.g., Ranking SVM, etc.), for example, may be employed, in whole or in part. As will be seen, at times, one or more ranking function(s) 128 may be employed, in whole or in part, to re-rank one or more previous recommendations, such as with respect to visually similar products, for example, such as to account for and/or accommodate a user's personal taste. Claimed subject matter is not so limited, of course. In some instances, one or more ranking function(s) 128 may, for example, be used, at least in part, to rank retrieved web documents in connection with an on-line search, such as in a listing of returned search results. CIS102 may further include a processor 130 that may, for example, be capable of executing computer-readable code and/or similar executable instructions so as to, for example, implement operations and/or processes, such as associated with example environment 100, such as discussed below.

In operative use, a user and/or client may access a particular shopping or like web site (e.g., http://shopping-.yahoo.com, www.amazon.com, www.ebay.com, www.overstock.com, etc.) and may submit and/or specify a search query, which may comprise a product-related query, for example, by utilizing resources 106. Browser 108 may, for example, initiate communication of one or more electrical digital signals representing a query from resources 106 to CIS 102 via communications network 104. Search engine 118 and/or feature extraction engine 122 may look up visual index 120 and/or database 116, for example, and may retrieve and/or locate one or more products of interest and/or establish a listing of recommended products that may be based, at least in part, on an order in accordance with ranking function(s) 128, for example. CIS 102 may then communicate search and/or recommendation results to resources 106, such as for displaying on interface 110, such as, for example, via one or more product-related images and/or text (e.g., prices, descriptions, etc.) within an associated web page. Of course, this is merely an example of an on-line product-related recommendation, and claimed subject matter is not limited in this regard. For example, in some instances, one or more products may be recommended as a result of accessing a web site, such as, before, during, or after a checkout, while browsing, via e-mail, other communication (e.g., a text message, etc.), and/or the like.

Figure 2:
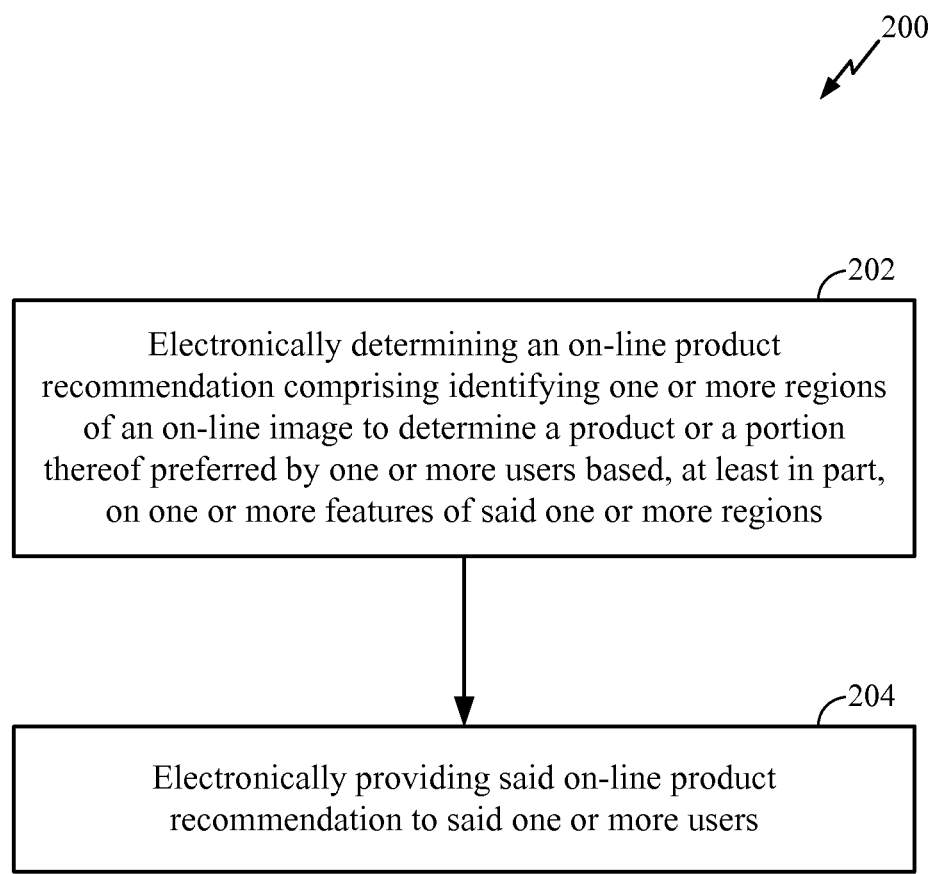
FIG. 2 is a flow diagram illustrating an example implementation of a process for an on-line product-related recommendation.

FIG. 2 is a flow diagram illustrating an implementation of an example process 200 that may be performed, in whole or in part, using one or more computing and/or network devices to facilitate and/or support one or more operations and/or techniques for on-line recommendations, such as product-related recommendations, for example. It should be noted that web documents, on-line products, and/or like content acquired and/or produced, such as, for example, input signals, output signals, operations, results, etc. associated with example process 200 may be represented via one or more digital signals and/or states, for example. Although one or more operations are illustrated and/or described concurrently and/or with respect to a certain sequence, other sequences, such as alternate and/or concurrent operations may be employed. In addition, although the description below references particular aspects and/or features illustrated in certain other figures, one or more operations may be performed with other aspects and/or features.

Figure 3:
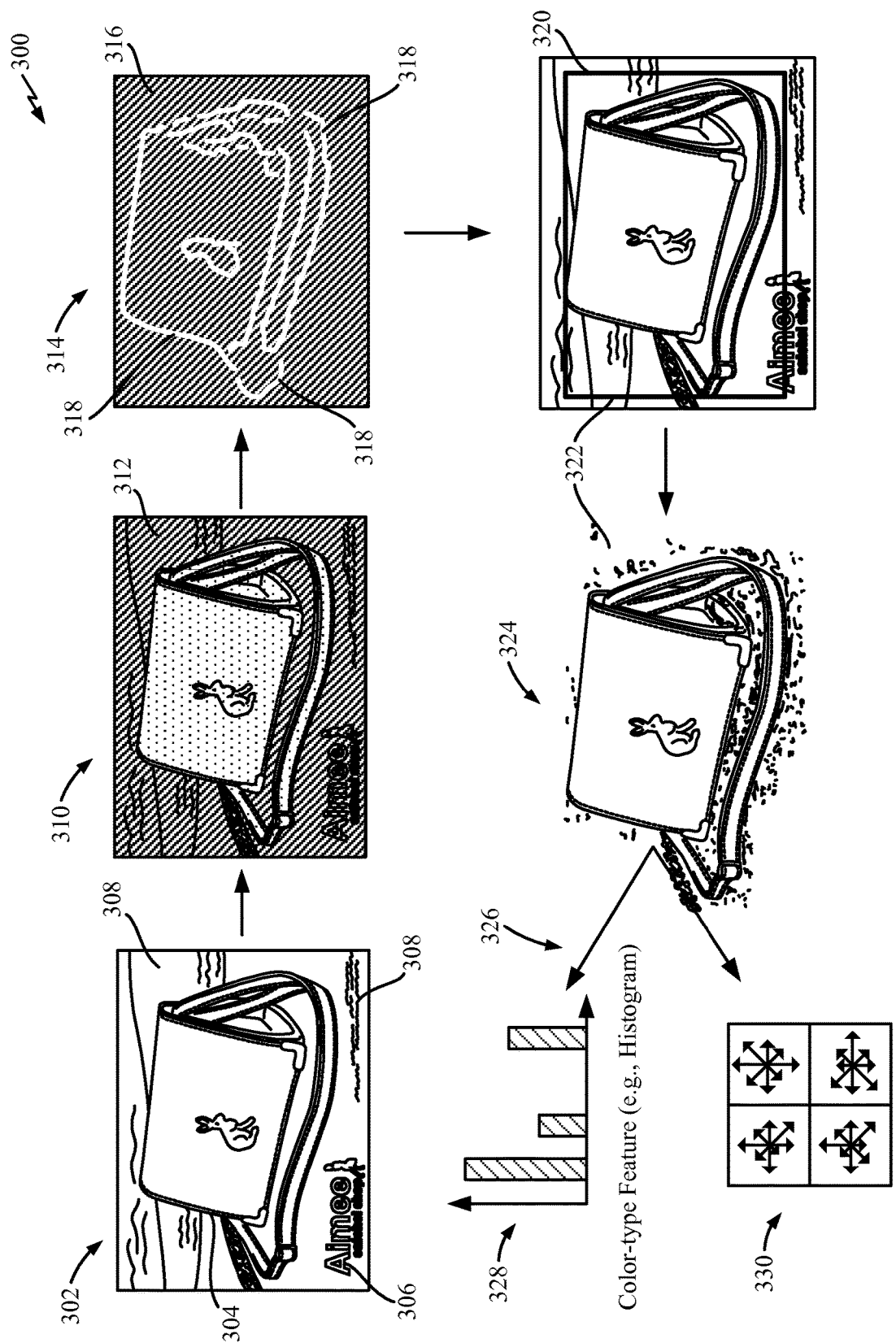
FIG. 3 is a flow diagram illustrating an example implementation of image processing.

Example process 200 may begin, for example, at operation 202, with electronically determining an on-line product recommendation comprising identifying one or more regions of an on-line image to determine a product or a portion thereof preferred by one or more users based, at least in part, on one or more features of the one or more regions. More specifically, as illustrated via an image-related sequence of an implementation of an example process 300 of FIG. 3, an on-line image 302 representative of a product 304, such as a purse, for example, may be processed so as to remove less preferred and/or less relevant content, such as a retailer's name 306, an associated background 308, and/or the like. For example, as referenced via an arrow at 310, a saliency map 312 representing visual saliency of image 302 may be generated and/or used, at least in part, to identify a region, such as a region in which a product, or portion thereof, is more likely to stand out visually. In an embodiment, one or more appropriate techniques and/or approaches, such as to evaluate and/or establish visual contrasts sufficiently differentiating product 304 from its surrounding background 308 and/or retailer's name 306, for example, may be employed, in whole or in part. As a way of illustration, one potential approach may include, for example, calculating a Euclidean distance between a color pixel vector in a Gaussian-filtered image of product 304, such as with an average color vector for an input image, such as on-line image 302. In some instances, color contrast, edge density, superpixel straddling (SS) cues, like measures and/or like techniques may be used, at least in part, to contrast and/or evaluate visual features, such as, for example, intensities within image 302. Of course, claimed subject matter is not limited to a particular approach.

In some instances, image 302 may, for example, be segmented and/or partitioned, such as into several locally homogenous regions and/or sub-regions (not shown) that may be overlapped with and/or superimposed onto saliency map 312. A size or granularity of segmented regions and/or sub-regions may be determined, at least in part, experimentally and/or dynamically. In some instances, choosing a granularity of local regions and/or sub-regions that may reduce a number of broken edges, such as within regions and/or sub-regions, for example, may provide potentially beneficial results. As indicated generally at 314, based, at least in part, on image saliency, a suitable edge map 316 (e.g., binary, etc.) may, for example, be generated, such as via tracing one or more edges 318 within local regions and/or sub-regions using one or more appropriate image processing techniques, in an embodiment. Here, one or more edge-tracing and/or detecting approaches, such as utilizing various intensity gradients (e.g., a Canny edge detector, etc.), second-order approaches (e.g., a differential edge detector, etc.), and/or the like may be used, at least in part, and/or otherwise considered. Techniques for image processing are generally known and need not be described here in greater detail.

As illustrated via a bounding box at 320, based, at least in part, on edge map 316, a region of interest 322 may, for example, be identified. In some instances, region of interest 322 may comprise, for example, a larger region, such as comprising one or more local regions and/or sub-regions indicative of where product 304 is more likely to stand out visually, such as within on-line image 302. In an embodiment, one or more edge map-related statistical approaches may be used, at least in part. For example, edge densities within segmented local regions and/or sub-regions may be computed, and a resulting region, such as region of interest 322 comprising one or more higher edge-related values may be identified. As seen, at times, region of interest 322 may, for example, include a relatively continual edge-traced boundary, which may correspond to product 304 outlined and/or traced via edge map 316, in an embodiment. Thus, as further indicated at 324, region of interest 322 comprising on-line product 304 (e.g., a purse, etc.) that may be preferred by one or more users, such as for purposes of purchasing and/or shopping, for example, may be identified and/or extracted, such as for further processing.

As further illustrated at 326, based, at least in part, on region of interest 322, one or more features of interest, such as one or more visual-type features descriptive of one or more attributes and/or characteristics of on-line product 304, for example, may be extracted, such as from product-related image 302. Here, any suitable feature extraction techniques or approaches, such as scale-invariant feature transform (SIFT), gradient location and orientation histogram (GLOH), etc. may be used, at least in part. As was indicated, in some instances, one or more extracted visual-type features may comprise, for example, a color-type feature, referenced generally at 328, and/or a texture-type feature, referenced generally at 330. In at least one implementation, one or more color-type features 328 may, for example, be represented via any suitable color distribution within region of interest 322 and/or image 302, such as a color histogram comprising a frequency of occurrences of color-related values (e.g., how many times a visual word occurs in an image, etc.). In this context, "histogram" generally refer to a graphical representation of a distribution of values over a range, such as, for example, of a color and/or texture-related value, such as in a product-related image or a portion thereof. Regarding texture-type feature 330, a Histogram of Oriented Gradients (HOG) may, for example, be utilized, at least in part, to describe one or more texture-related attributes and/or characteristics of region of interest 322 and/or image 302. Thus, in some instances, one or more histograms may, for example, be used, at least in part, to visually "summarize" (e.g., characterize, etc.) product 302, such as via counts of one or more visual words (e.g., a bag of words, etc.) within region of interest 322 and/or image 302. Histograms are generally known and need not be described here in greater detail.

As was indicated, at times, a visual-bag-of-words (VBOW)-type processing may be used, at least in part, to facilitate and/or support indexing, searching, and/or retrieval of a product-related image, such as image 302, for example, in connection with one or more color-type features 328 and/or texture-type features 330. For example, features may be normalized in a suitable manner, such as independently, and/or may be concatenated so as to arrive at a visual descriptor using one or more appropriate techniques. In this context, "descriptor" and "visual descriptor" may be used interchangeably and may refer to a suitable parameter or parameters descriptive of one or more visual features of a product-related image (e.g., image 302, etc.). For example, in at least one implementation, a descriptor may comprise an n-dimensional feature vector, such as represented via one or more feature points, though claimed subject matter is not so limited. Thus, at times, a VBOW may, for example, facilitate and/or support translation of a set of image-related descriptors into a vector of suitable dimensionality, such as across product-related image 302 or any portion thereof. As discussed above, in some instances, one or more product image-related descriptors may be clustered in a suitable manner, such as off-line, for example, to arrive at a relatively smaller and/or discrete set of quantized feature vectors, which may be referred to as "visual words." As was also indicated, visual words may, for example, represent one or more specific patterns shared by one or more descriptors in a cluster, such as describing one or more characteristics (e.g., color-related, texture-related, etc.) of an on-line product. As a way of illustration, here, Dominant Color Descriptor (DCD), Scalable Color Descriptor (SCD), Color Structure Descriptor (CSD), Homogeneous Texture Descriptor (HTD), Texture Browsing Descriptor (TBD), Edge Histogram Descriptor (EHD), or the like may be used, at least in part, or otherwise considered. Thus, for this example, image 302 may, for example, be described via a set of visual words included in a database, such as summarizing an image's distribution via their word counts (e.g., VBOW, etc.) comprising a visual vocabulary. Claimed subject matter is not limited to particular features, descriptors, processing approaches, etc., of course.

As alluded to previously, at times, one or more users may be motivated to purchase one or more products encountered on-line, such as while browsing through one or more web documents, which may include, for example, on-line fashion news, celebrity sightings and/or appearances, electronic shows, and/or the like. In some instances, however, one or more images associated with these and/or like web documents may be unannotated and/or may have insufficient, noisy (e.g., brief, abbreviated, biased, etc.), etc. annotations, as was alluded to previously. In addition, certain on-line images may, for example, depict a variety of products differing in size and/or shape, products having a cluttered background and/or plain background (e.g., a plain white background) and/or the like. At times, this may negatively impact and/or affect in some manner a determination regarding user interest and/or purchase of an on-line product, for example. This may also lower a product recommendation accuracy, for example, which may result in missed sales and/or marketing opportunities, loss of revenue, lower user engagement, lower user loyalty, and/or the like. Typical approaches, such as manually labeling and/or annotating web documents to address these or like issues, for example, may be time-consuming, labor-intensive, and/or error-prone, as was indicated.

Figure 4:
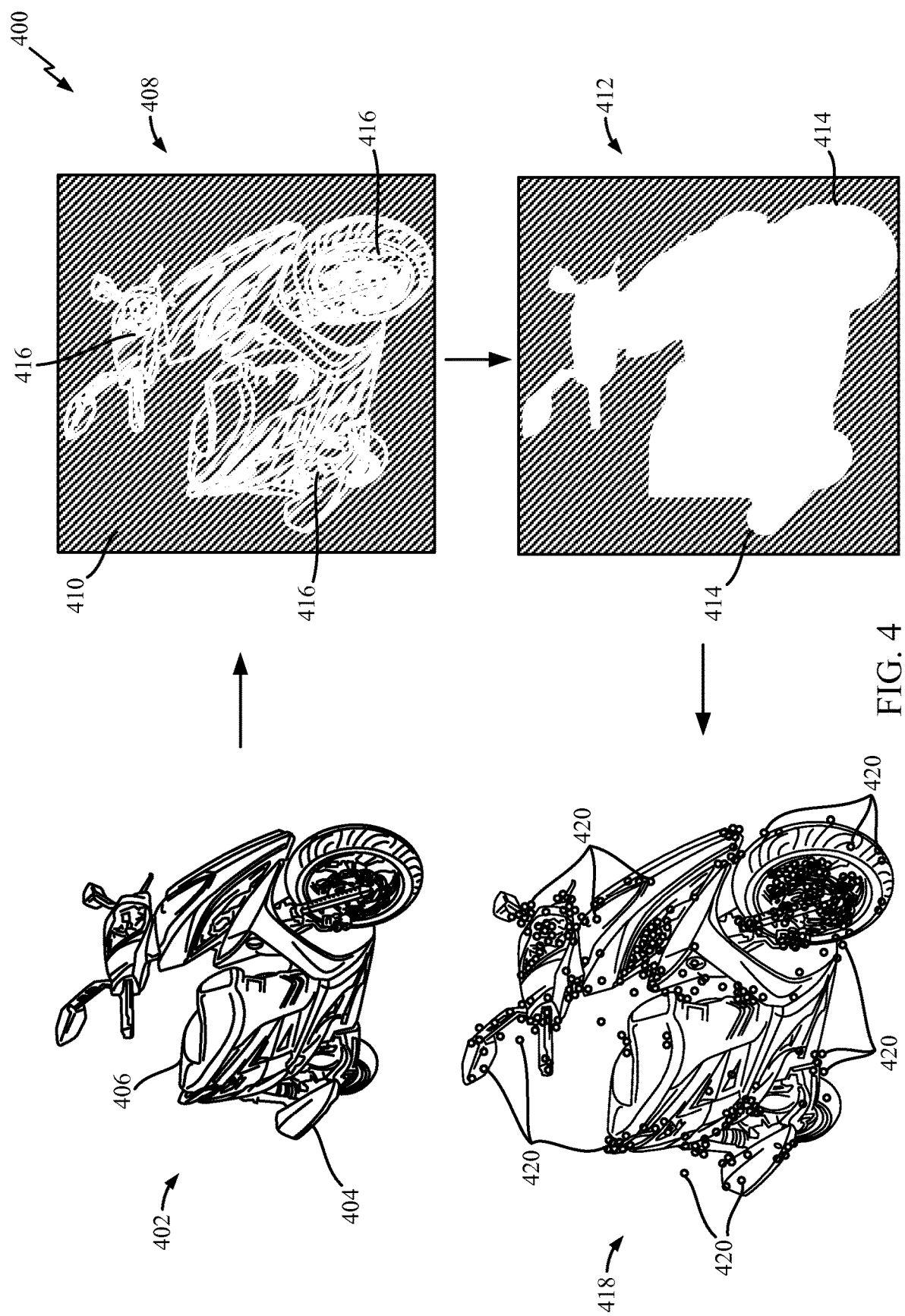
FIG. 4 is a flow diagram illustrating another example implementation of image processing.

Accordingly, in an implementation, instead of or in addition to product-related image processing discussed above, such as in connection with extracting a region of interest, for example, at times, an image or sequence of images may be processed via locating and/or identifying meaningful content, such as within the image or sequence of images. For example, as shown in FIG. 4, an on-line image 402, representative of a product 404, such as a scooter, for example, may be depicted or displayed against a plain white background 406. FIG. 4, for example, illustrates an example implementation. For example, as indicated at 408, one or more edge-tracing and/or detecting approaches, such as discussed above, may be used, at least in part, to generate an edge map 410 that may help to distinguish meaningful content (e.g., associated with product 404, etc.) from plain white background 406. In some instances, meaningful content may, for example, be located and/or identified based, at least in part, on a product contour and/or outline, such as referenced generally at 412, characterized, for example, via an edge-traced outer boundary 414. For example, at times, meaningful content of a product-related image, such as 402, as an example, may be located and/or identified via eroding and/or suppressing visual noise, which may include one or more inner and/or broken edges, referenced generally at 416, so as to arrive at a visual image 418 of a product, such as 404. In some instances, a visual image comprising meaningful content, such as image 418, for example, may comprise a product-related image (e.g., image 402, etc.) with visual noise (e.g., a background, etc.) reduced and/or removed.

As further illustrated, in some instances, a set of visual words, such as represented via interest points 420, for example, may be extracted from visual image 418 using one or more appropriate techniques. For example, at times, visual words may be extracted based, at least in part, on a local invariant feature (e.g., SIFT, etc.), such as accounting for a color and/or texture-related distribution within image 418, as discussed above. In an embodiment, a set of visual words, such as represented via interest points 420 may, for example, provide an adequately distinct description of product-related image 402, visual image 418, and/or product 404 (e.g., a scooter, etc.) and may be used, at least in part, for one or more product-related searches and/or recommendations, such as in connection with an inverted index. For example, an inverted index having a mapping of visual words to image numbers may be referenced, at least in part, to associate and/or map a product-related search query with one or more product-related images included in a database, such as to retrieve one or more images sharing a particular visual word. Again, indexing, locating, retrieving, etc. images via an inverted file is generally known and need not be described here in greater detail.

Figure 5:
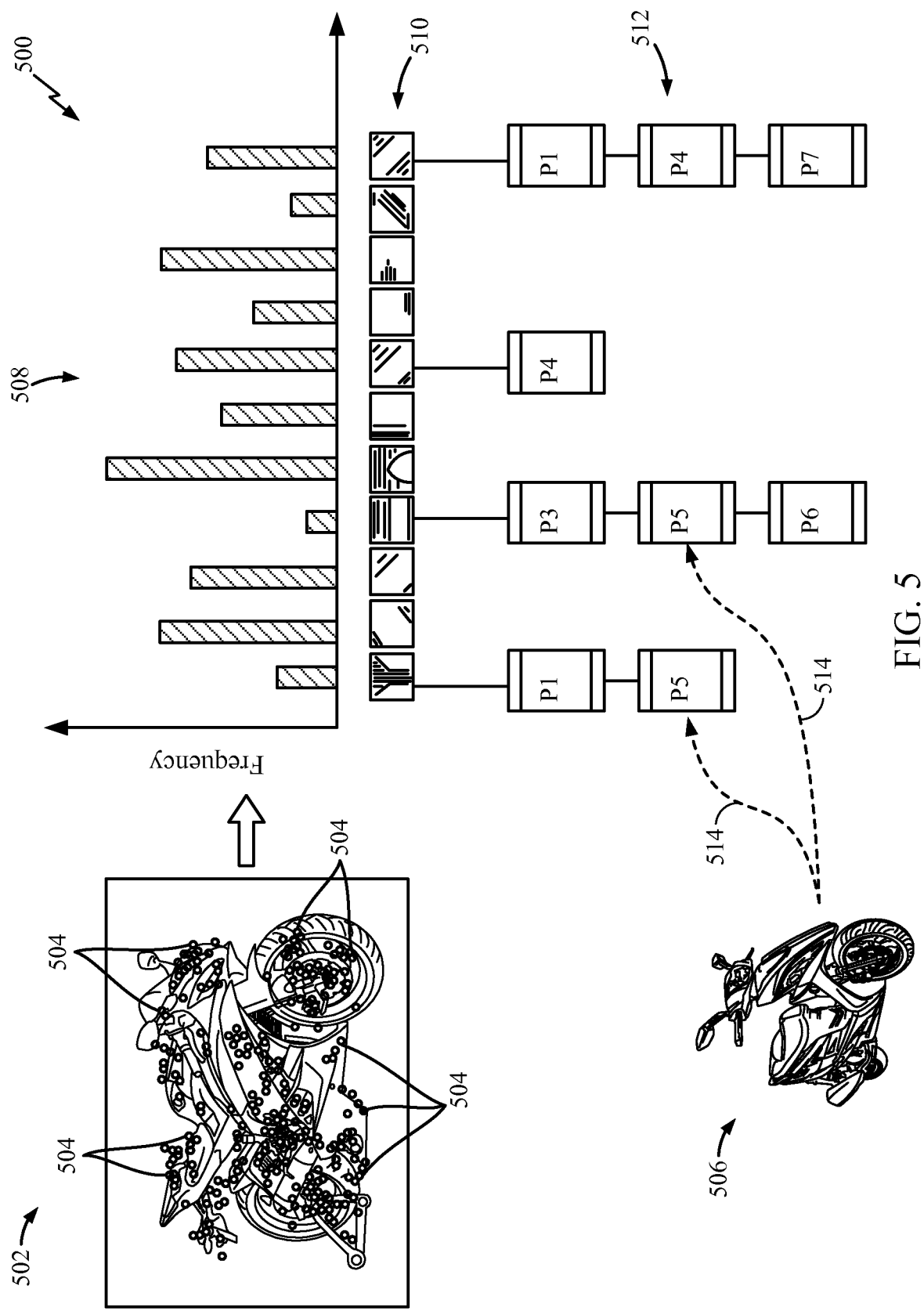
FIG. 5 is a flow diagram illustrating another example implementation of a process for an on-line product-related recommendation.

In some instances, such as to determine a product-related recommendation during an on-line search, one or more color-type and/or texture-type features, such as discussed above, may, for example, be compared with and/or matched against like features of a vocabulary of visual words, such as represented via one or more digital signals and/or digital states (e.g., memory states) stored in a suitable database (e.g., visual index 120, database 116, etc. of FIG. 1). Here, a visual-bag-of-words-type (VBOW) processing may, for example, be used, at least in part, to locate and/or retrieve one or more product-related images, such as in connection with an inverted index. An embodiment, for example, is illustrated via a sequence of example images, such as shown in FIG. 5. As discussed previously, a product-related image, such as 502, may be characterized via a set of visual words, such as represented via interest points 504 "summarizing" one or more visual features of a product 506, such as a scooter. A set of visual words may, for example, be captured via one or more applicable signal and/or states representations. For example, one or more applicable signal and/or states representations may comprise a feature space constructed via descriptor instances of respective visual features (e.g., texture-type, color-type, etc.) extracted from one or more on-line images (e.g., scooter-related, etc.). At times, visual features may, for example, be clustered so as to quantize a feature space into a discrete number of visual words, such as represented via interest points 504. As was indicated, visual words may comprise, for example, cluster centers, such as k-cluster centers, just to illustrate one possible implementation.

Thus, at times, for a given product-related image, such as image 502, a VBOW histogram counting how many times visual words occur in image 502, for example, may be utilized, at least in part, to visually "summarize" product-related image 502, such as in connection with word occurrences (e.g., codewords, etc.), indicated generally at 510. In some instances, to characterize word occurrences 510, common types of salient local patterns, such as assigned to a set of visual words descriptive of product 506, for example, may be used, at least in part. As also seen, at times, word occurrences 510 may, for example, be correlated with one or more product-related images included in a database 512 (e.g., a visual vocabulary, etc.), such as referenced via nodes P1, P2, P3, and so forth. Salient local patterns may, for example, be obtained from image 502 or any portion thereof via any suitable technique, such as via a saliency map discussed above. At times, it may, for example, be useful for salient local patterns to provide one or more appropriate geometric dependencies among corresponding visual descriptors. These or like techniques are generally known and need not be described here in greater detail. As such, in an implementation, given product 506, database 512 may, for example, be searched, such as via an inverted index discussed above, and one or more related products (e.g., represented via nodes P5, etc.) may be located and/or retrieved. For example, as indicated generally at 514, one or more visual features of a product-related search query (e.g., visual words for product 506, etc.) may be associated with and/or mapped to indices of database images, thus, locating and/or retrieving appropriate database images (e.g., represented via nodes P5, etc.) that share particular visual words. Again, indexing, locating, retrieving, etc. images via an inverted file is generally known and need not be described here in greater detail.

As was indicated, at times, instead of or in addition to certain trending, popular, etc. items, it may be desirable and/or useful to provide an on-line recommendation regarding relatively newer, visually and/or contextually relevant, taste-related (e.g., personally preferred, etc.), etc. products, such as clothes, shoes, handbags, and/or the like. As such, depending at least in part on a particular implementation, one or more suitable metrics and/or measures, such as a visual product similarity, personal visual preference, and/or contextual similarity, for example, may be used, at least in part, to more effectively and/or more efficiently recommend on-line products. Thus, to facilitate and/or support a recommendation of a visually similar product, one or more features of product-related image 502, such as represented via an n-dimensional vector, as discussed above, may be compared with like features of a database, such as 512, for example, of other product-related images, for example. In an embodiment, based, at least in part, on a Euclidian norm or length metric (e.g., an $L^2$ distance, etc.), one or more product-related images, having one or more quantized feature vectors (e.g., visual words, etc.) that were stored using a database, such as 512, may be selected for one or more recommendations, for example. Of course, these are merely details relating to a particular recommendation approach, and claimed subject matter is not so limited.

In some instances, such as to facilitate and/or support a recommendation based, at least in part, on a personal visual preference, a user's on-line behavior and/or one or more taste-related preferences may, for example, be observed and/or collected, such as via one or more appropriate techniques. For example, a user's image-related browsing history as well as one or more user personal preferences (e.g., styles, designs, etc.) characterized via one or more previously purchased products may be collected. One or more features of non-preferred products, such as viewed but not purchased products, for example may also be collected in a suitable manner (e.g., in a log, database, etc.). Based, at least in part, on collected behavior and/or preferences, a personal preference-type ranking function may, for example, be built and/or trained, such as by using a learner function (e.g., machine learning). In this context, "learner function" refers to a process capable of learning to recognize one or more characteristics of interest, such as a pattern, for example, so as to make one or decisions with respect to characteristics, including latent characteristics and/or apparent characteristics, based, at least in part, on observed examples. By way of example but not limitation, in at least one implementation, machine learning, such as ranking SVM, for example, may be used, at least in part. For example, in an embodiment, a particular user-related transform matrix and/or similar type transform may result in transformation of a standard and/or generic feature space to a user's preference space. Ranking and/or learner functions, including spatial transformations, such as in connection with machine learning, are generally known and need not be described in greater detail.

Continuing with the above example, at times, a personalized metric, such as a user's personal preference score descriptive of one or more user preferences, for example, may be derived from a user's past browsing history and/or one or more personal preferences so as to arrive at a resulting user-preferred feature space. At times, a user's personal preference score may, for example, be derived by ranking user's preferred (e.g., purchased, etc.) as well as non-preferred (e.g., viewed but not purchased, etc.) products using any suitable learning models and/or processes. For example, at times, Ranking support vector machine (SVM) model and/or process may be used, at least in part, or otherwise considered. Thus, in at least one implementation, a supervised learning model and/or process (e.g., Ranking SVM, etc.) may, for example, transform an original feature space into a user's personal preference space. At times, a user's personal preference space may, for example, be sufficient to separate a user's visually preferred products from visually non-preferred and/or less preferred products, such as by a statistically significant and/or otherwise suitable margin. In some instances, based, at least in part, on a user's personal preference score, a visual product similarity-type recommendation may, for example, be adjusted (e.g., re-ranked, etc.), such as via a trained ranking function (e.g., Ranking SVM, etc.), such as utilizing a weighted preference score, just to illustrate one possible implementation. As a result, visual similarity of on-line products including a user's personal taste, as well as changes therein, may, for example, be accounted for and/or considered, in an embodiment. Claimed subject matter is not so limited, of course. Any of a variety of possible other statistical measures and/or metrics may be utilized, in whole or in part, to account for distribution of various patterns and/or feature properties, such as, for example, a median, a mean, a mode, a percentile of mean, a number of instances, a ratio, a rate, a frequency, an entropy, mutual information, etc., or any combination thereof.

As was indicated, in some implementations, a recommendation may, for example, account for a contextual aspect of an on-line behavior and/or purchase, such as via a suitable contextual metric and/or measure. By way of example but not limitation, at times, a contextual metric and/or measure may comprise, for example, a weighted average score obtained, at least in part, via combining and/or integrating a number of previously derived ranking scores and/or measures. For example, in some instances, to obtain a contextual metric, image-related ranking scores may be combined and/or integrated, at least in part, with one or more ranking scores typically derived in connection with text-type document retrieval. To illustrate, observed on-line behavior and/or purchase-related preferences, such as more frequently viewed product categories and/or average price of products purchased in these categories, for example, may be ranked, such as via a suitable learner function, as discussed above. Likewise, product-related images having some distribution of words (e.g., written text, etc.) may be summarized by their word counts (e.g., a bag-of-words, etc.) and may be ranked via one or more appropriate text-related retrieval techniques (e.g., Ranking SVM, etc.). Based, at least in part, on obtained rankings, in some instances, a contextual metric and/or measure comprising a weighted average of a visual, text, and/or user preference scores may, for example, be derived and used, at least in part, as a final recommendation score so as to suggest one or more products to an on-line user. Again, claimed subject matter is not limited to a particular approach, score, measure, metric, function, etc.

Figure 6:
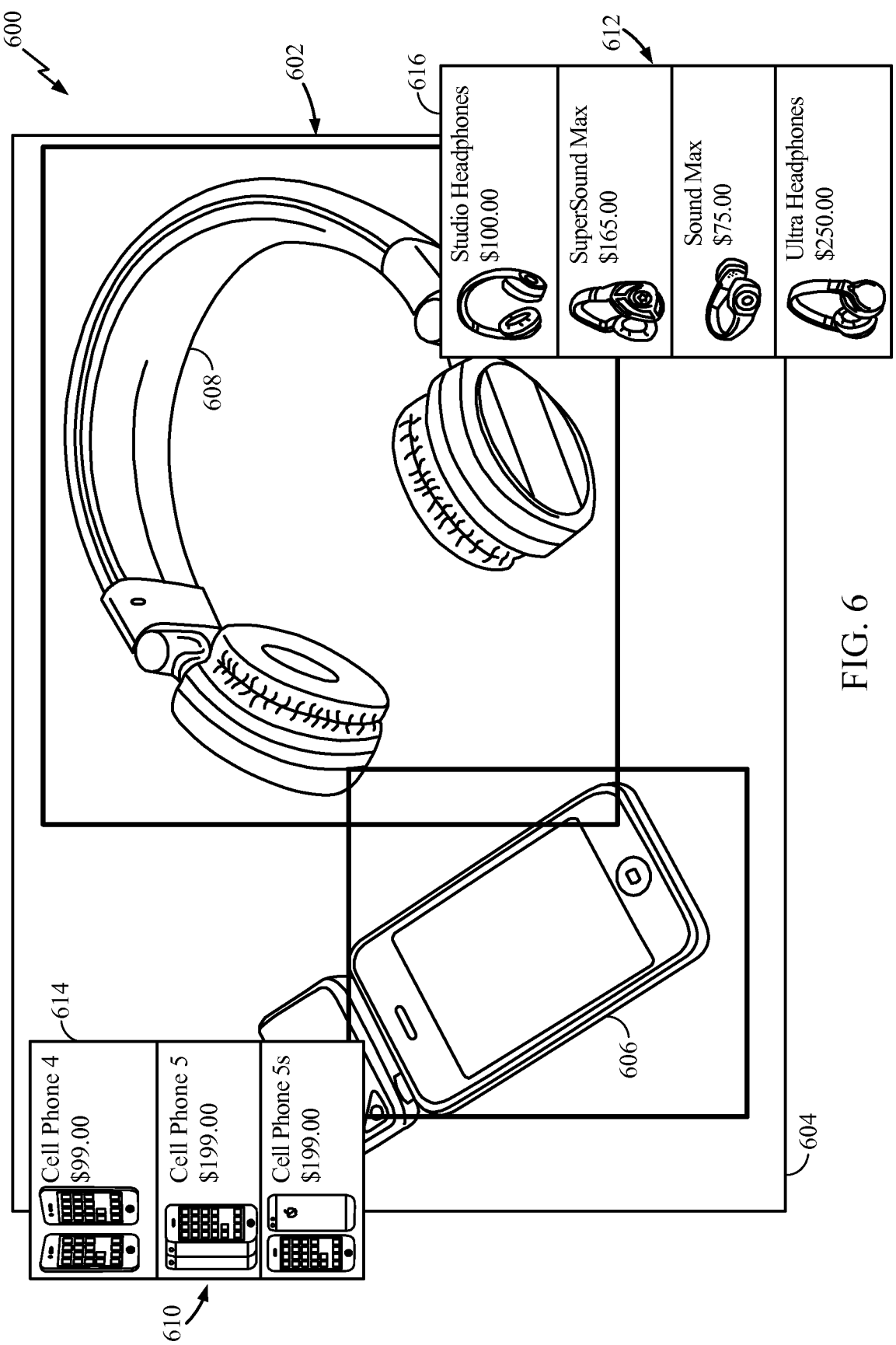
FIG. 6 is an example implementation of an example on-line product-related recommendation.

Referring now back to example process 200 of FIG. 2, at operation 204, an on-line product recommendation may, for example, be electronically provided (e.g., transmitted or made accessible) to the one or more users. For example, a suitable computing platform, such as CIS 102 of FIG. 1, may communicate one or more recommended products to a user's computing device for display, such as via one or more product-related images and/or text. An example of an implementation of one or more on-line product-related recommendations, such as may be communicated and/or displayed (e.g., via display 600 of a user's computing device), for example, is illustrated in FIG. 6.

For example, as previously discussed, a display, such as 600, may be operated and/or otherwise supported by a suitable client device, such as, for example, a desktop computer, a notebook, a laptop computer, and/or other special purpose computing device, that may communicate with a suitable computing platform (e.g., CIS 102 of FIG. 1, etc.) via an electronic network (e.g., the Internet, an intranet, device network, etc). As was also indicated, at times, an on-line recommendation may, for example, be communicated (e.g., transmitted or made accessible) with respect to a web document 602 that may comprise an unannotated image and/or photograph, referenced generally at 604.

As illustrated, on-line products may comprise, for example, a smart telephone 606 and/or headphones 608, for which on-line recommendations 610 and/or 612, respectively, may be provided. For this example, on-line recommendations 610 and/or 612 may comprise, for example, one or more product-related details, such as an image, price, retailer's name, product description, etc., which may include and/or be represented via one or more hyperlinks. As also illustrated, in some instances, on-line recommendations 610 and/or 612 may, for example, be displayed in a foreground and/or next to on-line products and may be ranked, such as according to one or more ranking functions (e.g., ranking function(s) 128 of FIG. 1, etc.), as discussed above. Depending at least in part on an implementation, recommendations 610 and/or 612 may, for example, be presented as a result of accessing web document 602 comprising image 604, via respective hover boxes 614 and/or 616, such as while an on-screen cursor (not shown) is moved and/or placed over a product of interest (e.g., via a mouse-over, tooltip, etc. operation), via an e-mail, etc., just to illustrate a few possible implementations. Of course, any sort of user interaction is intended to be included within claimed subject matter.

As was indicated, on-line recommendations 610 and/or 612 may, for example, be provided using, at least in part, a special purpose computing platform, such as via a suitable search engine. For this example, a client device hosting a graphical user interface (GUI) capable of displaying a web document, such as 602 comprising image 604, may communicate with a computing platform on a network, such as CIS 102 of FIG. 1, for example, to bring up product-related recommendations 610 and/or 612, ranked or otherwise, and/or associated details. At times, product-related recommendations 610 and/or 612 and/or related details may, for example, be stored with reference to one or more sets of visual words descriptive of smart telephone 606 and/or headphones 608 and may be determined based, at least in part, on a visual-bag-of-words-type processing, such as in connection with an inverted index (e.g., visual index 120 of FIG. 1, etc.). Of course, details with respect to on-line recommendations 610 and/or 612 and/or a client-server relation are merely examples, and claimed subject matter is not so limited. For example, in certain implementations, a suitable application and/or like software may be hosted on a client device, such as an application, rather than via a web interface, for example, and may generate and/or provide recommendations 610 and/or 612 and/or product-related details, at least in part.

Figure 7:
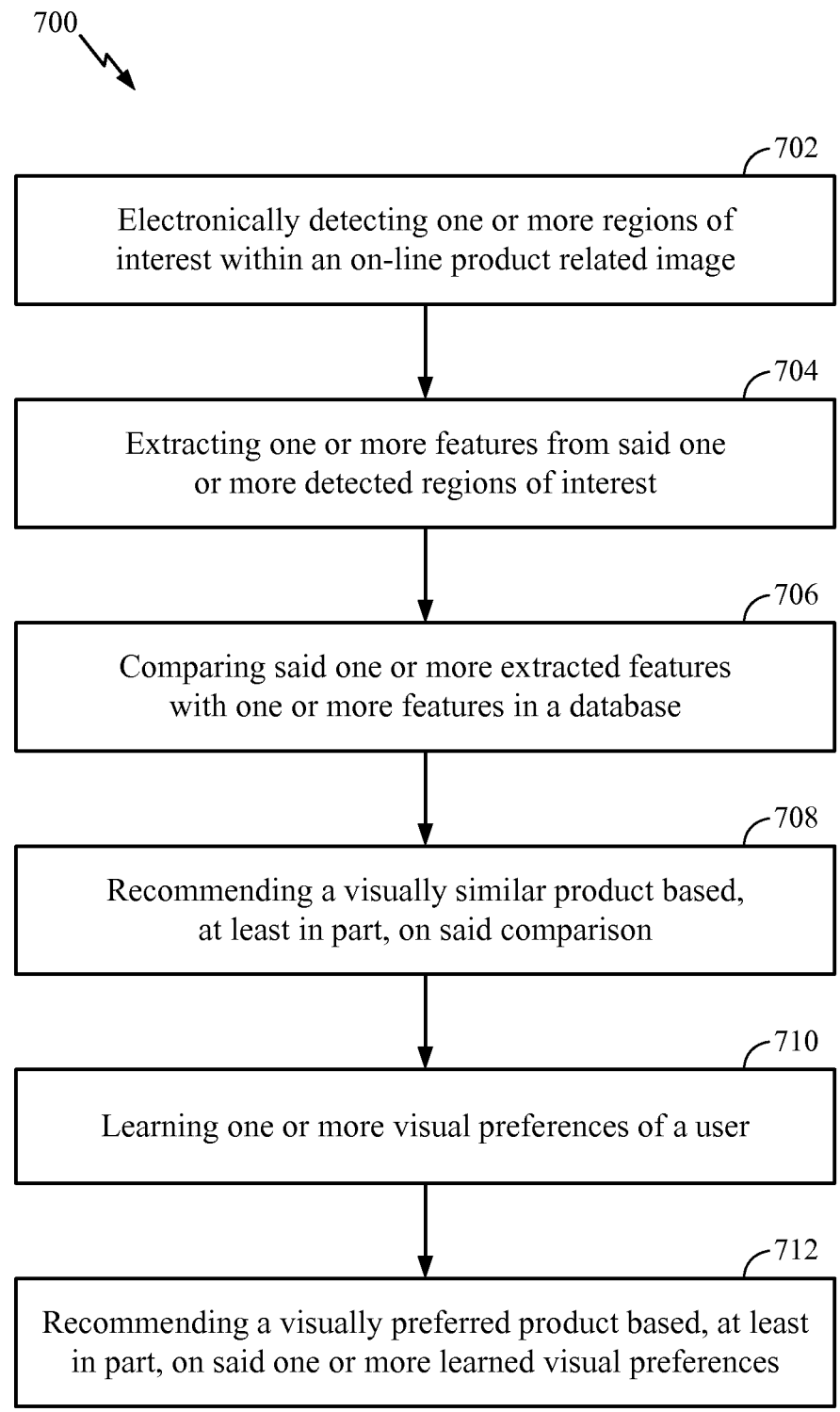
FIG. 7 is a flow diagram illustrating yet another example of an implementation of a process for an on-line product-related recommendation.

FIG. 7 is a flow diagram illustrating another implementation an example process 700 that may be performed, in whole or in part, using one or more computing devices to facilitate and/or support one or more operations and/or techniques for on-line recommendations, such as product-related recommendations, for example. Process 700 is illustrated herein as a non-limiting example. Likewise, one or more operations are illustrated and/or described concurrently and/or with respect to a certain sequence, other sequences and/or concurrent operations may be employed. In addition, although the description below references particular aspects and/or features, one or more operations may be performed with other aspects and/or features (e.g., in place of or in addition to).

Example process 700 may, for example, begin at operation 702 with electronically detecting one or more regions of interest, such as within one or more on-line images. As was indicated, at times, one or more on-line images may comprise, for example, one or more product-related images, just to illustrate one possible implementation. In some instances, one or more regions of interest may, for example, be detected so as to remove less preferred and/or less relevant image-related content (e.g., a background, retailer's name, non-product-related pixels, etc.). As discussed above, a saliency map, such as a product-related edge map, may, for example, be generated. For example, an edge map may be generated by overlapping and/or superimposing one or more regions and/or sub-regions of a partitioned image onto a saliency map. Based, at least in part, on an edge map, as an example, a region of interest within an image, such as representative of an on-line product preferred by one or more users, such as for purposes of purchasing and/or shopping, for example, may be detected, such as using one or more techniques discussed above.

At operation 704, one or more features of one or more detected regions of interest may, for example, be extracted, such as using one or more appropriate techniques. As previously mentioned, in some instances, one or more features may comprise, for example, visual-type features descriptive of one or more attributes and/or characteristics of an on-line product. Depending, at least in part, on a particular implementation, one or more visual-type features may include, for example, a color-type feature, texture-type feature, and/or the like, including any combination thereof.

As an example, in at least one implementation, for a color-type feature, a color histogram comprising, for example, a frequency of occurrences of color-related signal sample values within a region of interest and/or product-related image may be used, at least in part, and/or otherwise considered. As another example, for a texture-type feature, a Histogram of Oriented Gradients (HOG) and/or a Visual Bag of Words (VBOW) may, for example, be utilized, at least in part. Thus, in some instances, a resulting feature descriptive of an on-line product may comprise and/or be represented via, for example, an n-dimensional vector, as was also indicated.

With regard to operation 706, one or more extracted features may, for example, be compared with and/or matched against one or more like features, such as descriptive of an on-line product, stored as one or more digital signals and/or digital states in a suitable database (e.g., visual index 120, database 116, etc. of FIG. 1). As previously discussed, one or more features may, for example, be represented via one or more sets of visual words, which may comprise a visual vocabulary. As was indicated, at times, a visual-bag-of-words-type processing may, for example, be used, at least in part, such as in connection with an inverted index for feature comparison and/or matching. For example, a visual vocabulary may be searched using one or more appropriate techniques, and one or more related products (e.g., represented via product-related images, etc.) may be located, identified, and/or retrieved.

At operation 708, based, at least in part, on feature comparison and/or matching, one or more visually similar on-line products may, for example, be recommended to a computing device user. For example, a Euclidian norm and/or similar length metric (e.g., an $L^2$ distance between a feature of interest within an image and one or more features of one or more images stored in a database, etc.) may, for example, be used, at least in part, and/or otherwise considered. For example, one or more suitable features may be selected for recommendation, just to illustrate one possible implementation.

Accordingly, as discussed herein, on-line recommendations, such as product-related recommendations, for example, may provide benefits. For example, by taking into account a visual similarity of on-line products, personal visual preference of a user, and/or contextual aspect of a purchase, among other things, user's personal taste and/or bias may be more sufficiently and/or more satisfactorily addressed. In addition, visual noise, such as represented via a cluttered, plain, etc. background that may be typical of on-line images including product-related images, for example, may be reduced and/or removed so as to achieve a more accurate recommendation. Also, one or more operations and/or techniques discussed herein may help to process unannotated and/or insufficiently annotated images, for example, which may include a variety of products differing in size and/or shape. Thus, on-line recommendations, such as product-related recommendations, for example, may improve user engagement and/or loyalty, increase click-through and/or conversion rates, boost revenue and/or usability of a search engine, reduce cost, errors, and/or labor involved, and/or the like. Of course, implementation details are merely provided as an illustrative example, and claimed subject matter is not so limited.

Figure 8:
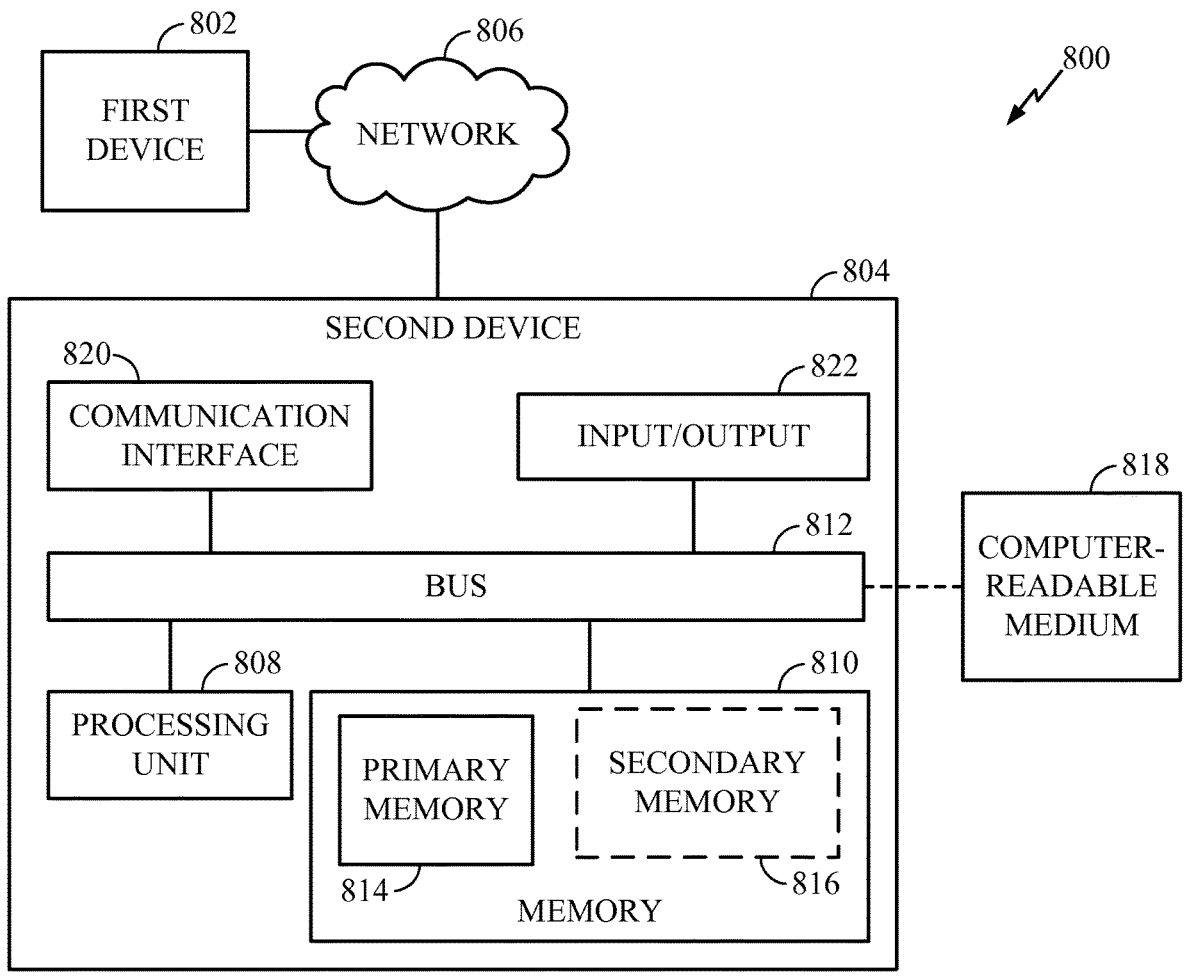
FIG. 8 is a schematic diagram illustrating an implementation of a computing environment associated with one or more special purpose computing apparatuses.

FIG. 8 is a schematic diagram illustrating an example computing environment 800 that may include one or more devices capable of implementing, in whole or in part, one or more processes or operations for one or more on-line recommendations, such as product-related recommendations discussed above in connection with FIGS. 1-7, for example. Computing environment 800 may include, for example, a first device 802 and a second device 804, which may be operatively coupled via a network 806. In an embodiment, first device 802 and second device 804 may be representative of any electronic device, appliance, and/or machine that may have capability to exchange content or like signals over network 806. Network 806 may represent one or more communication links, processes, and/or resources having capability to support exchange and/or communication of content or like signals between first device 802 and second device 804. Second device 804 may include at least one processing unit 808 that may be operatively coupled to a memory 810 through a bus 812. Processing unit 808 may represent one or more circuits to perform at least a portion of one or more applicable computing procedures or processes. For example, although not shown, it should be appreciated that in at least one implementation processing unit 808 or like specialized devices or processors may comprise one or more processing modules capable of electronically determining an on-line product-related recommendation comprising identifying one or more regions of an on-line image to determine a product or a portion thereof preferred by one or more users based, at least in part, on one or more features of the one or more regions. In some instances, processing unit 808 or like specialized devices or processors may also comprise, for example, one or more processing modules capable of electronically providing the on-line product-related recommendation to the one or more users. It should also be noted that all or part of one or more processing modules may be implemented using or otherwise including hardware, firmware, software, or any combination thereof.

Memory 810 may represent any signal storage mechanism and/or appliance. For example, memory 810 may include a primary memory 814 and a secondary memory 816. Primary memory 814 may include, for example, a random access memory, read only memory, etc. In certain implementations, secondary memory 816 may be operatively receptive of, or otherwise have capability to be coupled to a computer-readable medium 818.

Computer-readable medium 818 may include, for example, any medium that may store and/or provide access to content or like signals, such as, for example, code and/or instructions for one or more devices in operating environment 800. It should be understood that a storage medium may typically, although not necessarily, be non-transitory and/or may comprise a non-transitory device. In this context, a non-transitory storage medium may include, for example, a device that is physical and/or tangible, meaning that the device has a concrete physical form, although the device may change state. For example, one or more electrical binary digital signals representative of content, in whole or in part, in the form of zeros may change a state to represent content, in whole or in part, as binary digital electrical signals in the form of ones, to illustrate one possible implementation. As such, "non-transitory" may refer, for example, to any medium and/or device remaining tangible despite this change in state.

Second device 804 may include, for example, a communication interface 820 that may provide for or otherwise support communicative coupling of second device 804 to network 806. Second device 804 may include, for example, an input/output device 822. Input/output device 822 may represent one or more devices and/or features that may be able to accept or otherwise input human and/or machine instructions, and/or one or more devices and/or features that may be able to deliver or otherwise output human or machine instructions.

According to an implementation, one or more portions of an apparatus, such as second device 804, for example, may store one or more binary digital electronic signals representative of content expressed as a particular state of a device such as, for example, second device 804. For example, an electrical binary digital signal representative of content may be "stored" in a portion of memory 810 by affecting and/or changing a state of particular memory locations, for example, to represent content as binary digital electronic signals in the form of ones and/or zeros. As such, in a particular implementation of an apparatus, such a change of state of a portion of a memory within a device, such a state of particular memory locations, for example, to store a binary digital electronic signal representative of content constitutes a transformation of a physical thing, for example, memory device 810, to a different state or thing.

Figure 9:
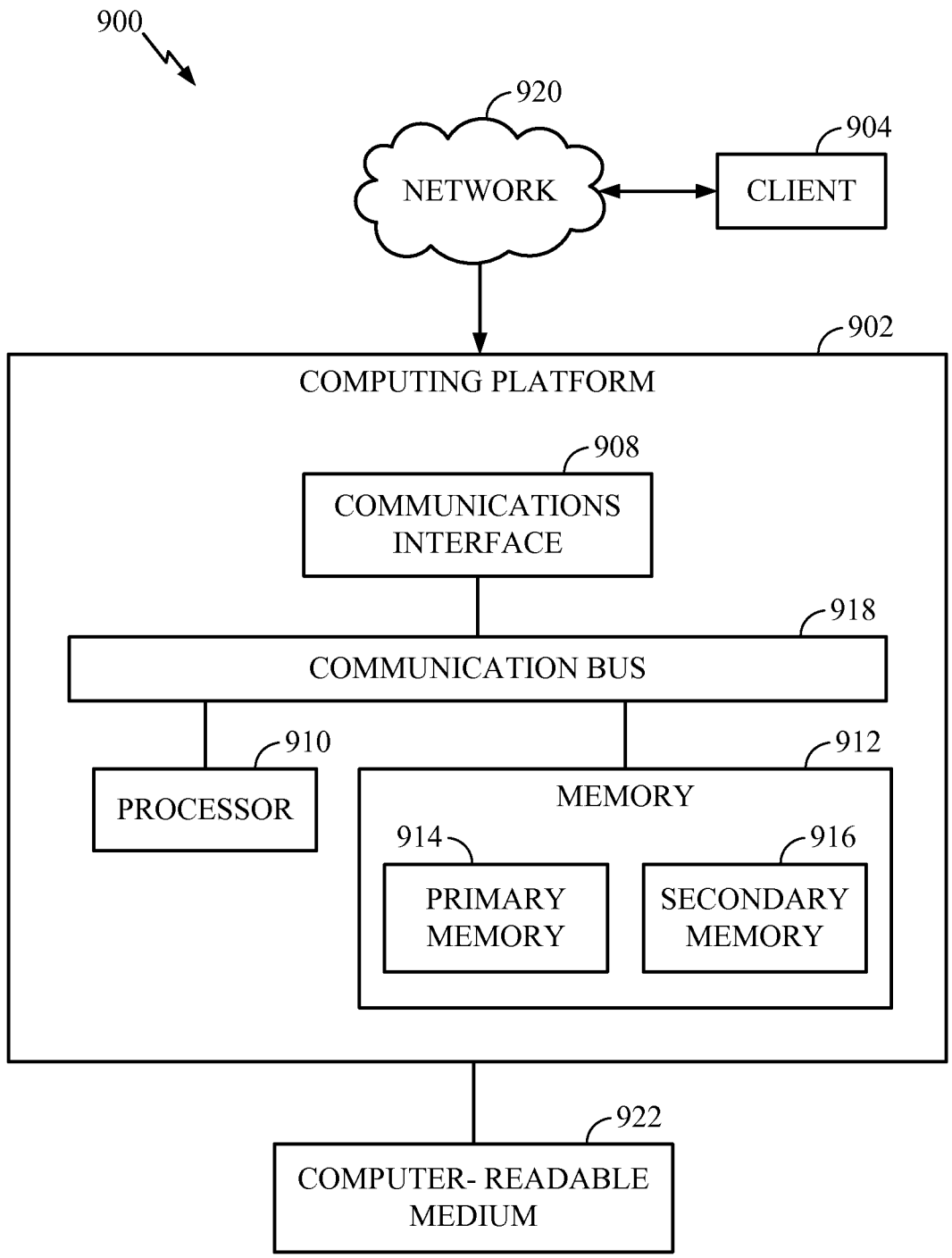
FIG. 9 is a schematic diagram illustrating an implementation of a computing platform that may be employed in a client-server type networking interaction.

For purposes of illustration, FIG. 9 is an example of an embodiment of a computing platform 900 that may be employed in a client-server type interaction, such as described infra in connection with rendering a GUI via a device, such as a network device and/or a computing device, for example. In FIG. 9, computing platform 902 may interface with client 904, which may comprise features of a client device, for example. Communications interface 908, processor (e.g., processing unit) 910, and memory 912, which may comprise primary memory 914 and secondary memory 916, may communicate by way of communication bus 918, for example. In FIG. 9, client 904 may represent one or more sources of analog, uncompressed digital, lossless compressed digital, and/or lossy compressed digital formats for content of various types, such as video, imaging, text, audio, etc. in the form physical states and/or signals, for example. Client 904 may communicate with computing platform 902 by way of an Internet connection via network 920, for example. Although the computing platform of FIG. 9 shows the above-identified components, claimed subject matter is not limited to computing platforms having only these components as other implementations may include alternative arrangements that may comprise additional components, fewer components, or components that function differently while achieving similar results. Rather, examples are provided merely as illustrations. It is not intended that claimed subject matter to limited in scope to illustrative examples.

Processor 910 may be representative of one or more circuits, such as digital circuits, to perform at least a portion of a computing procedure and/or process. By way of example, but not limitation, processor 910 may comprise one or more processors, such as controllers, microprocessors, microcontrollers, application specific integrated circuits, digital signal processors, programmable logic devices, field programmable gate arrays, the like, and/or any combination thereof. In implementations, processor 910 may perform signal processing to manipulate signals and/or states and/or to construct signals and/or states, for example.

Memory 912 may be representative of any storage mechanism. Memory 912 may comprise, for example, primary memory 914 and secondary memory 916, additional memory circuits, mechanisms, and/or combinations thereof may be used. Memory 912 may comprise, for example, random access memory, read only memory, and/or one or more data storage devices or systems, such as, for example, a disk drive, an optical disc drive, a tape drive, a solid-state memory drive, just to name a few examples. Memory 912 may be utilized to store a program. Memory 912 may also comprise a memory controller for accessing computer readable-medium 922 that may carry and/or make accessible content, code, and/or instructions, for example, executable by processor 910, some other controller and/or processor capable of executing instructions, for example.

Under the direction of processor 910, memory, such as memory cells storing non-transitory physical states, representing for example, a program, may be executed by processor 910 and generated signals may be transmitted via the Internet, for example. Processor 910 may also receive digitally-encoded signals from client 904.

Network 920 may comprise one or more network communication links, processes, services, applications and/or resources to support exchanging communication signals between a client, such as 904 and computing platform 902, which may, for example, comprise one or more servers (not shown). By way of example, but not limitation, network 920 may comprise wireless and/or wired communication links, telephone or telecommunications systems, Wi-Fi networks, Wi-MAX networks, the Internet, a local area network (LAN), a wide area network (WAN), or any combinations thereof.

The term "computing platform," as used herein, refers to a system and/or a device, such as a computing device, that includes a capability to process (e.g., perform computations) and/or store data in the form of physical signals and/or physical states. Thus, a computing platform, in this context, may comprise hardware, software, firmware, or any combination thereof (other than software per se). Computing platform 902, as depicted in FIG. 9, is merely one such example, and claimed subject matter is not limited in scope to this particular example. For one or more embodiments, a computing platform may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback, recording devices, and/or any combination of the above. Further, unless specifically stated otherwise, a process as described herein, with reference to flow diagrams and/or otherwise, may also be executed and/or affected, in whole or in part, by a computing platform.

Memory 912 may store cookies relating to one or more users and may also comprise a computer-readable medium that may carry and/or make accessible content, code and/or instructions, for example, executable by processor 910, some other controller and/or processor capable of executing instructions, for example. A user may make use of an input device, such as a computer mouse, stylus, track ball, keyboard, and/or any other similar device capable of receiving user actions and/or motions as input signals. Likewise, a user may make use of an output device, such as a display, a printer, etc., or any other device capable of providing signals, generating visual or audio stimuli and/or other similar output stimuli for a user.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR) mesh, 2nd, 3rd, or 4th generation (2G, 3G, or 4G) cellular technology, other technologies, and/or the like. Network access technologies may enable wide area coverage for devices, such as client devices with varying degrees of mobility, for example.

A network may enable radio frequency and/or other wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11a/b/g/n/ac, and/or the like. A wireless network may include virtually any type of now known, and/or to be developed, wireless communication mechanism by which signals may be communicated between devices, such as a client device, such as a computing device and/or a network device, between and/or within a network, and/or the like.

Communications between a computing device and/or a network device and a wireless network may be in accordance with known, and/or to be developed cellular telephone communication network protocols including, for example, global system for mobile communications (GSM), enhanced data rate for GSM evolution (EDGE), and worldwide interoperability for microwave access (WiMAX). A computing device and/or a networking device may also have a subscriber identity module (SIM) card, which, for example, may comprise a detachable smart card that is able to store subscription information of a user, and/or is also able to store a contact list of the user. A user may own the computing device and/or networking device and/or may otherwise be a user, such as a primary user, for example. A computing device may be assigned an address by a wireless, wired telephony network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, and/or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known, and/or to be developed operating systems, derivatives and/or versions thereof, including personal computer operating systems, such as a Windows®, iOS, Linux®, a mobile operating system, such as iOS®, Android®, Windows Mobile®, and/or the like. A computing device and/or network device may include and/or may execute a variety of possible applications, such as a client software application enabling communication with other devices, such as communicating one or more messages, such as via email, short message service (SMS), and/or multimedia message service (MMS), including via a network, such as a social network including, but not limited to, Facebook®, LinkedIn®, Twitter®, Flickr®, and/or Google+®, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored or streamed video, and/or games such as, but not limited to, fantasy sports leagues. The foregoing is provided merely to illustrate that claimed subject matter is intended to include a wide range of possible features or capabilities.

A network may also be extended to another device communicating as part of another network, such as via a virtual private network (VPN). To support a VPN, logical broadcast domain transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets, such as in a network of participating digital communications, A logical broadcast domain may be compatible with now known, and/or to be developed, past, present, or future versions of any, but not limited to the following network protocol stacks: ARCNET, AppleTalk, ATM, Bluetooth®, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring®, USB, and/or X.25. A logical broadcast domain may employ, for example, TCP/IP, UDP, DECnet, NetBEUI, IPX, Appletalk®, other, and/or the like. Versions of the Internet Protocol (IP) may include IPv4, IPv6, other, and/or the like.

It will, of course, be understood that, although particular embodiments will be described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example (other than software per se). Likewise, although claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing platform, and/or other system, such as a computing device and/or a network device, for example, that may result in an embodiment of a method in accordance with claimed subject matter being executed, such as a previously described embodiment, for example; although, of course, claimed subject matter is not limited to previously described embodiments. As one potential example, a computing platform may include one or more processing units and/or processors, one or more devices capable of inputting/outputting, such as a display, a keyboard and/or a mouse, and/or one or more memories, such as static random access memory, dynamic random access memory, flash memory, and/or a hard drive.

Thus, as illustrated in various example implementations and/or techniques presented herein, in accordance with certain aspects, a method may be provided for use as part of a special purpose computing device and/or other like machine that accesses digital signals from memory and/or processes digital signals to establish transformed digital signals which may be stored in memory as part of one or more files, such as content files, and/or a database specifying or otherwise associated with an index, as discussed above.

Some portions of the detailed description herein are presented in terms of algorithms and/or symbolic representations of operations on binary digital signals stored within a memory of a specific apparatus and/or special purpose computing device and/or platform. In the context of this particular specification, the term specific apparatus and/or the like includes a general purpose computer once it is programmed to perform particular functions pursuant to instructions from program software. Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing, such as in association with networks, such as computing and/or communications networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and/or similar terms are to be associated with appropriate physical quantities and are intended to merely be convenient labels.

Unless specifically stated otherwise, as apparent from the discussion herein, it is appreciated that throughout this specification discussions utilizing terms such as "processing," "computing," "calculating," "determining" and/or the like refer to actions and/or processes of a specific apparatus, such as a special purpose computer or a similar special purpose electronic computing device. In the context of this specification, therefore, a special purpose computer and/or a similar special purpose electronic computing device is capable of manipulating and/or transforming signals, typically represented as physical electronic and/or magnetic quantities within memories, registers, and/or other content storage devices, transmission devices, and/or display devices of the special purpose computer or similar special purpose electronic computing device.

The terms, "and", "or", "and/or" and/or similar terms, as used herein, may include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms may be used to describe any feature, structure, and/or characteristic in the singular and/or may be used to describe a plurality or some other combination of features, structures and/or characteristics. Though, it should be noted that this is merely an illustrative example and claimed subject matter is not limited to this example. Again, particular context of description and/or usage may provide helpful guidance regarding inferences to be drawn.

Likewise, in this context, the terms "coupled", "connected," and/or similar terms may be used generically. It should be understood that these terms are not intended as synonyms. Rather, "connected" if used generically may be used to indicate that two or more components, for example, are in direct physical, such as electrical contact; while, "coupled" if used generically may mean that two or more components are in direct physical or electrical contact; however, "coupled" if used generically may also mean that two or more components are not in direct contact, but may nonetheless co-operate or interact. The term coupled may also be understood generically to mean indirectly connected, for example, in an appropriate context.

While certain example techniques have been described and/or shown herein using various methods and/or systems, it should be understood by those skilled in the art that various other modifications may be made, and/or equivalents may be substituted, without departing from claimed subject matter. Additionally, many modifications may be made to adapt a particular situation to the teachings of claimed subject matter without departing from the concept(s) described herein. Therefore, it is intended that claimed subject matter not be limited to particular examples disclosed, but that claimed subject matter may also include all implementations falling within the appended claims, and/or equivalents thereof.

What is claimed is:

1. A method comprising:
   executing computer instructions on at least one processor of at least one computing device that includes at least one memory, said computer instructions having been stored in said at least one memory; and
   storing in said at least one memory of said at least one computing device any results of having executed said computer instructions on said at least one processor of said at least one computing device;
   wherein executing the computer instructions comprises:
      detecting one or more regions of an on-line image that are of interest to a user;
      ascertaining one or more features of the one or more regions of the on-line image, wherein ascertaining one or more features of the on-line image includes computing, as a function of a Euclidean space, n-dimensional color vectors for the one or more regions of the on-line image;
      identifying at least one representation of a product in the on-line image based, at least in part, on the one or more features;
      comparing or matching the one or more features of the one or more regions of the on-line image with a set of features of each of one or more images of a plurality of images to identify an image of the plurality of images that has visually similar feature properties to the on-line image and is determined to have a representation of the product;
      determining an image-related browsing history of the user;
      determining a preference of the user for one or more styles based, at least in part, on (i) products of interest to the user comprising one or more previously purchased products associated with the user and (ii) products not of interest to the user comprising one or more previously viewed but not purchased products associated with the user;
      determining a contextual metric associated with the product based, at least in part, on a combination of:
         (i) one or more image-related ranking scores associated with one or more images; and
         (ii) one or more text-related ranking scores associated with one or more images; and
      generating one or more electrical digital signals comprising an on-line product-related recommendation for the product based, at least in part, on the image having the visually similar feature properties to the on-line image, the image-related browsing history of the user, and the preference of the user for the one or more styles, wherein the on-line product-related recommendation is based, at least in part, on the contextual metric.

2. The method of claim 1, comprising:
   electronically providing the on-line product-related recommendation to the user;
   learning, using a machine learning technique, one or more visual preferences of the user based, at least in part, on a response of the user to the on-line product-related recommendation; and
   electronically providing a second on-line product-related recommendation to the user based, at least in part, on the one or more visual preferences of the user.

3. The method of claim 1, wherein detecting one or more regions of an on-line image that are of interest to a user comprises:
   identifying the one or more regions of the on-line image that are of interest to the user based, at least in part, on a saliency map of the on-line image.

4. The method of claim 1, wherein ascertaining one or more features of the one or more regions of the on-line image comprises performing a visual-bag-of-words-type processing of the on-line image.

5. The method of claim 1, wherein said determination of said product, or a portion thereof, preferred by one or more users comprises a comparison of said one or more regions of said on-line image with one or more visual words of one or more product-related images included in a database.

6. The method of claim 1, wherein the on-line product-related recommendation is based, at least in part, on at least one of a visual product similarity; a personal visual preference; or a contextual similarity.

7. The method of claim 1, comprising:
   determining product categories viewed more than a threshold amount;
   determining a plurality of products purchased in the product categories viewed more than the threshold amount; and
   determining an average price of the plurality of products purchased in the product categories viewed more than the threshold amount,
   wherein at least one of the one or more image-related ranking scores or the one or more text-related ranking scores are based, at least in part, on (i) the product categories viewed more than the threshold amount and (ii) the average price of the plurality of products purchased in the product categories viewed more than the threshold amount.

8. The method of claim 1, wherein said one or more regions of said on-line image are identified based, at least in part, on at least one of the following:
   a color contrast-type measure;
   an edge density-type measure;
   a superpixel straddling (SS) cues-type measure; or
   any combination thereof.

9. The method of claim 1, wherein at least one of the one or more image-related ranking scores or the one or more text-related ranking scores are based, at least in part, on:
   an average price of products purchased in one or more product categories; and
   product categories viewed more than a threshold amount.

10. The method of claim 1, wherein at least one of the one or more image-related ranking scores or the one or more text-related ranking scores are based, at least in part, on an average price of products purchased in one or more product categories.

11. The method of claim 1, wherein at least one of the one or more image-related ranking scores or the one or more text-related ranking scores are based, at least in part, on product categories viewed more than a threshold amount.

12. The method of claim 1, wherein comparing or matching the one or more features of the one or more regions of the on-line image with a set of features of each of one or more images of a plurality of images comprises:
   identifying, using an index mapping each of the plurality of images to a corresponding set of features stored in at least one database, the at least one of the plurality of images that has visually similar feature properties to the one or more regions of the on-line image.

13. The method of claim 12, each of the plurality of images being stored in the at least one database in association with the corresponding set of features.

14. The method of claim 1, wherein comparing or matching the one or more features of the one or more regions of the on-line image with the set of features of each of one or more images of the plurality of images comprises:
   computing a Euclidean length metric between at least one of the one or more features of the one or more regions of the on-line image with at least one feature of the set of features of each of the one or more images of the plurality of images.

15. The method of claim 1, the on-line product-related recommendation including at least one of a recommendation for the product or including the image.

16. A method comprising:
   executing computer instructions on at least one processor of at least one computing device that includes at least one memory, said computer instructions having been stored in said at least one memory; and
   storing in said at least one memory of said at least one computing device any results of having executed said computer instructions on said at least one processor of said at least one computing device;
   wherein said computer instructions to be executed comprise instructions for generating an on-line product-related recommendation; wherein executing the computer instructions comprises: identifying one or more portions of a web document;
   ascertaining one or more features of the one or more portions of the web document, wherein ascertaining one or more features of the web document includes computing, as a function of a Euclidean space, n-dimensional color vectors for the one or more portions of the web document;
   determining an image-related browsing history of a user; determining a preference of the user for one or more styles based, at least in part, on (i) products of interest to the user comprising one or more previously purchased products associated with the user and (ii) products not of interest to the user comprising one or more previously viewed but not purchased products associated with the user;
   comparing or matching the one or more features of the one or more portions of the web document with a set of features in a database to determine a product that has visually similar feature properties to the one or more portions of the web document; and
   electronically recommending an on-line purchase of the product that has visually similar feature properties to the one or more portions of the web document, wherein at least one of determining a product that has visually similar feature properties to the one or more portions of the web document or electronically recommending an on-line purchase of the product is based, at least in part, on the image-related browsing history of the user, the preference of the user for the one or more styles, and a contextual metric determined based, at least in part, on at least one of one or more image-related ranking scores or one or more text-related ranking scores.

17. The method of claim 16, wherein said web document comprises at least one of an annotated web document; or an unannotated web document.

18. The method of claim 16, wherein executing the computer instructions comprises:
   learning, using one or more machine-learned functions, one or more visual preferences of the user based, at least in part, on a response of the user to the recommendation of the on-line purchase of the product; and
   electronically recommending a second on-line purchase of a second product based, at least in part, on the one or more visual preferences of the user.

19. The method of claim 15, wherein executing the computer instructions comprises:
   updating one or more machine-learned functions based, at least in part, on a response of the user to the recommendation of the on-line purchase of the product; and
   applying the one or more machine-learned functions to electronically recommend a second on-line purchase of a second product;
   wherein said one or more machine-learned functions are capable of identifying at least one of a personal visual preference of said user; a visual similarity of an on-line product; or a contextual similarity of at least one of said user or at least one on-line product.

20. An apparatus comprising:
   a computing platform comprising at least one computing device;
   said at least one computing device including at least one processor and at least one memory;
   said at least one computing device to execute computer instructions on said at least one processor;
   said computer instructions including instructions for generating at least one on-line product-related recommendation;
   wherein said computer instructions comprise instructions to:
   ascertain one or more features of one or more regions of an on-line image, wherein ascertaining one or more features of the on-line image includes computing, as a function of a Euclidean space, n-dimensional color vectors for the one or more regions of the on-line image;

determine a preference of a user for one or more styles based, at least in part, on (i) products of interest to the user comprising one or more previously purchased products associated with the user and (ii) products not of interest to the user comprising one or more previously viewed but not purchased products associated with the user;

determine product categories viewed more than a threshold amount;

determine a plurality of products purchased in the product categories viewed more than the threshold amount;

determine an average price of the plurality of products purchased in the product categories viewed more than the threshold amount, compare or match the one or more features of the one or more regions of the on-line image with a set of features in a database to determine a product that has visually similar feature properties to the one or more regions of the on-line image; and generate one or more electrical digital signals including an on-line product-related recommendation for the product, wherein at least one of determining a product or generating one or more electrical digital signals is based, at least in part, on the preference of the user for the one or more styles, wherein the on-line product-related recommendation is based, at least in part, on (i) the product categories viewed more than the threshold amount and (ii) the average price of the plurality of products purchased in the product categories viewed more than the threshold amount.

21. The apparatus of claim 20, wherein said computer instructions comprise instructions to electronically provide said on-line product-related recommendation to one or more users.

22. The apparatus of claim 20, wherein the instructions to generate one or more electrical digital signals including an on-line product-related recommendation for the product comprise instructions to:

retrieve an image mapped to the set of features in the database, the image including at least one representation of the product; and transmit the image.

* * * * *